(12) United States Patent
Miura

(10) Patent No.: US 11,263,147 B2
(45) Date of Patent: Mar. 1, 2022

(54) MEMORY SYSTEM INCLUDING LOGICAL-TO-PHYSICAL ADDRESS TRANSLATION TABLE IN A FIRST CACHE AND A COMPRESSED LOGICAL-TO-PHYSICAL ADDRESS TRANSLATION TABLE IN A SECOND CACHE

(71) Applicant: KIOXIA CORPORATION, Minato-ku (JP)

(72) Inventor: Takashi Miura, Yokohama (JP)

(73) Assignee: KIOXIA CORPORATION, Minato-ku (JP)

( * ) Notice: Subject to any disclaimer, the term of this patent is extended or adjusted under 35 U.S.C. 154(b) by 0 days.

(21) Appl. No.: 16/562,476

(22) Filed: Sep. 6, 2019

(65) Prior Publication Data

US 2020/0301847 A1 Sep. 24, 2020

(30) Foreign Application Priority Data

Mar. 19, 2019 (JP) .............................. JP2019-051550

(51) Int. Cl.
*G06F 12/1009* (2016.01)

(52) U.S. Cl.
CPC .... *G06F 12/1009* (2013.01); *G06F 2212/657* (2013.01); *G06F 2212/7201* (2013.01)

(58) Field of Classification Search
CPC ......... G06F 12/1009; G06F 2212/7201; G06F 2212/657
See application file for complete search history.

(56) References Cited

U.S. PATENT DOCUMENTS

| | | | |
|---|---|---|---|
| 6,275,588 B1* | 8/2001 | Videcrantz | H03M 7/30 380/255 |
| 2006/0285397 A1 | 12/2006 | Nishihara et al. | |
| 2013/0246689 A1 | 9/2013 | Matsudaira et al. | |
| 2017/0177497 A1 | 6/2017 | Chun et al. | |

(Continued)

FOREIGN PATENT DOCUMENTS

| | | |
|---|---|---|
| JP | 5130646 B2 | 1/2013 |
| JP | 2013-196115 A | 9/2013 |
| JP | 2019-160215 A | 9/2019 |

OTHER PUBLICATIONS

U.S. Appl. No. 16/119,713, filed Aug. 31, 2018, Miura, T.

*Primary Examiner* — David Yi
*Assistant Examiner* — Nicholas A. Paperno
(74) *Attorney, Agent, or Firm* — Oblon, McClelland, Maier & Neustadt, L.L.P.

(57) ABSTRACT

According to one embodiment, a memory system stores a part of a logical-to-physical address translation table stored in a nonvolatile memory, as a first cache, in a random-access memory, and stores a compressed logical-to-physical address translation table obtained by compressing the logical-to-physical address translation table, as a second cache, in the random-access memory. The memory system stores first information indicative of a part of a first address translation data, in a first area of a first entry of the second cache where first compressed address translation data is stored. When executing processing of checking a part of the first address translation data, the memory system refers to the first information stored in the first entry of the second cache.

11 Claims, 18 Drawing Sheets

(56) References Cited

U.S. PATENT DOCUMENTS

2017/0364446 A1* 12/2017 Pham .................. G06F 12/1009
2019/0286570 A1    9/2019 Miura
2020/0264971 A1*  8/2020 Ogawa ................ G06F 12/0292

* cited by examiner

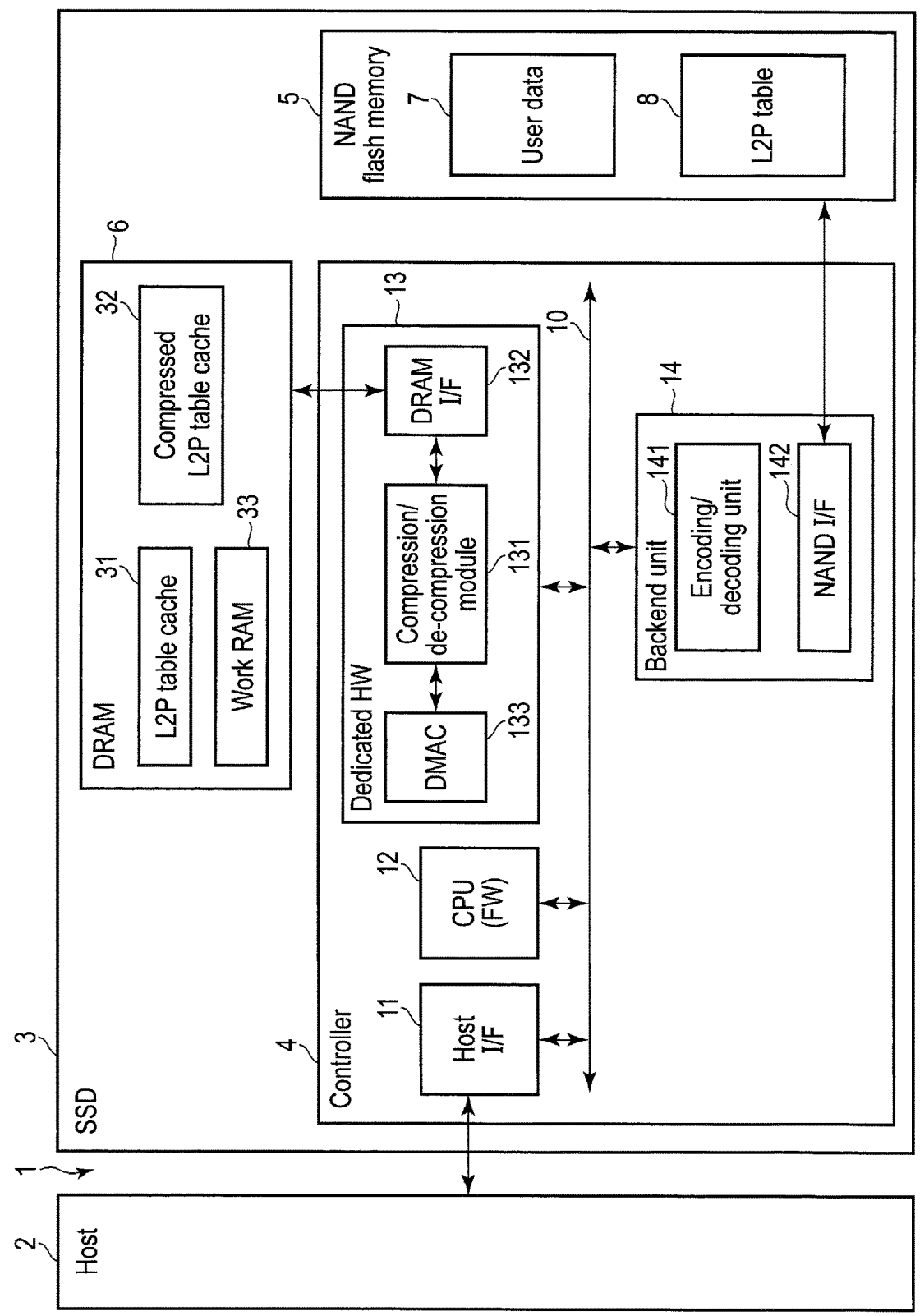
F I G. 1

L2P table 8

| Region addr. | Offset | | | | | | | | | |
|---|---|---|---|---|---|---|---|---|---|---|
| | +0 | +1 | +2 | +3 | +4 | +5 | +6 | +7 | ... | +15 |
| 0 | MCA | MCA | MCA | MCA | MCA | MCA | MCA | MCA | ... | MCA |
| 1 | | | | | | | | | ... | |
| 2 | | | | | | | | | ... | |
| 3 | | | | | | | | | ... | |
| 4 | | | | | | | | | ... | |
| 5 | | | | | | | | | ... | |
| ⋮ | | | | | | | | | ... | |
| M | | | | | | | | | ... | |

} M+1

F I G. 3

L2P table cache 31

| ID | Tag | Offset | | | | | | | | | |
|---|---|---|---|---|---|---|---|---|---|---|---|
| | | +0 | +1 | +2 | +3 | +4 | +5 | +6 | +7 | ... | +15 |
| 0 | 2 | MCA | MCA | MCA | MCA | MCA | MCA | MCA | MCA | ... | MCA |
| 1 | 1 | | | | | | | | | ... | |
| 2 | 5 | | | | | | | | | ... | |
| 3 | 4 | | | | | | | | | ... | |
| ⋮ | ⋮ | | | | | | | | | ... | |
| N | 10 | | | | | | | | | ... | |

} N+1

F I G. 4

Compressed L2P table cache

| Region addr. | Compressed address translation data |
|---|---|
| 0 | Compressed data  0 |
| 1 | 1 |
| 2 | 2 |
| 3 | 3 |
| 4 | 4 |
| 5 | 5 |
| ⋮ | ⋮ |
| M | M |

32

M+1

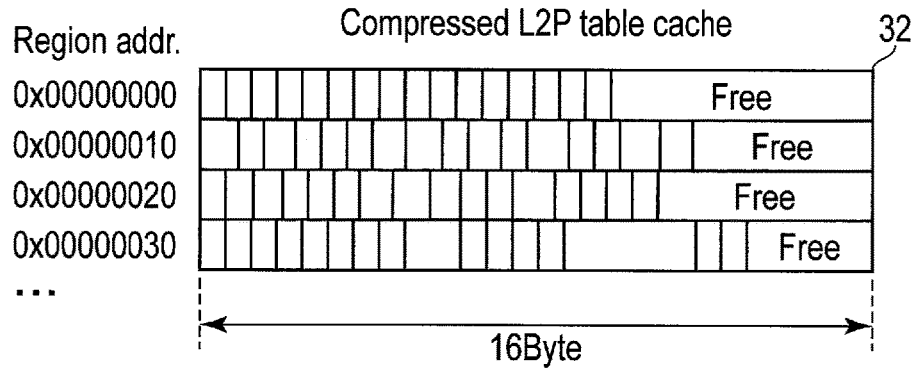
F I G. 8
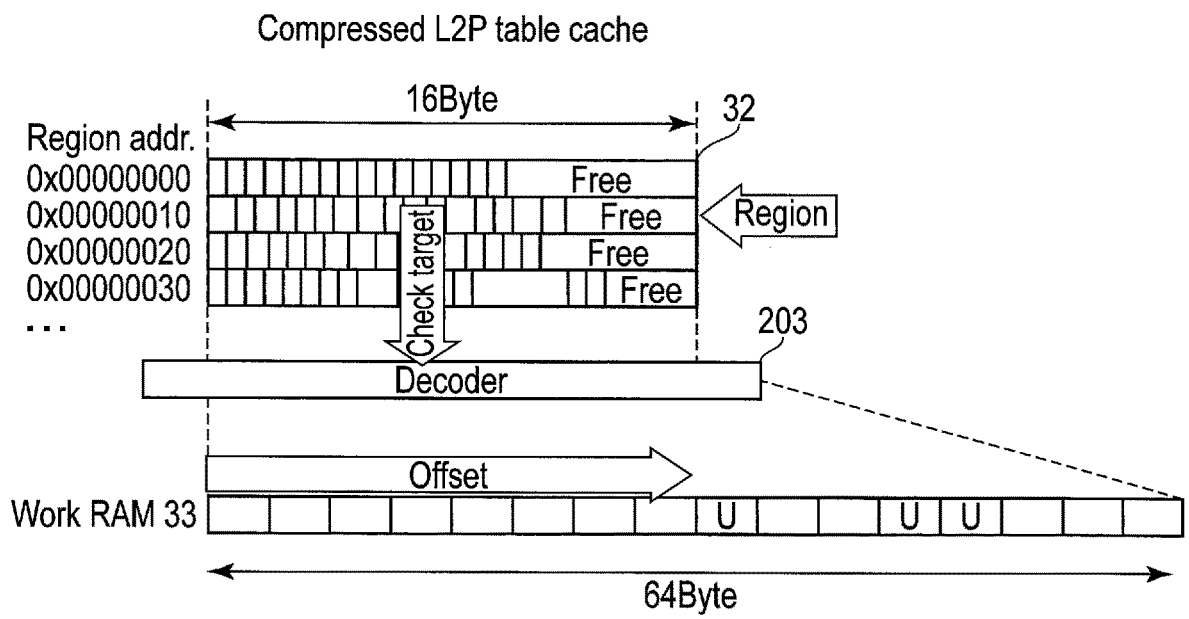
F I G. 9

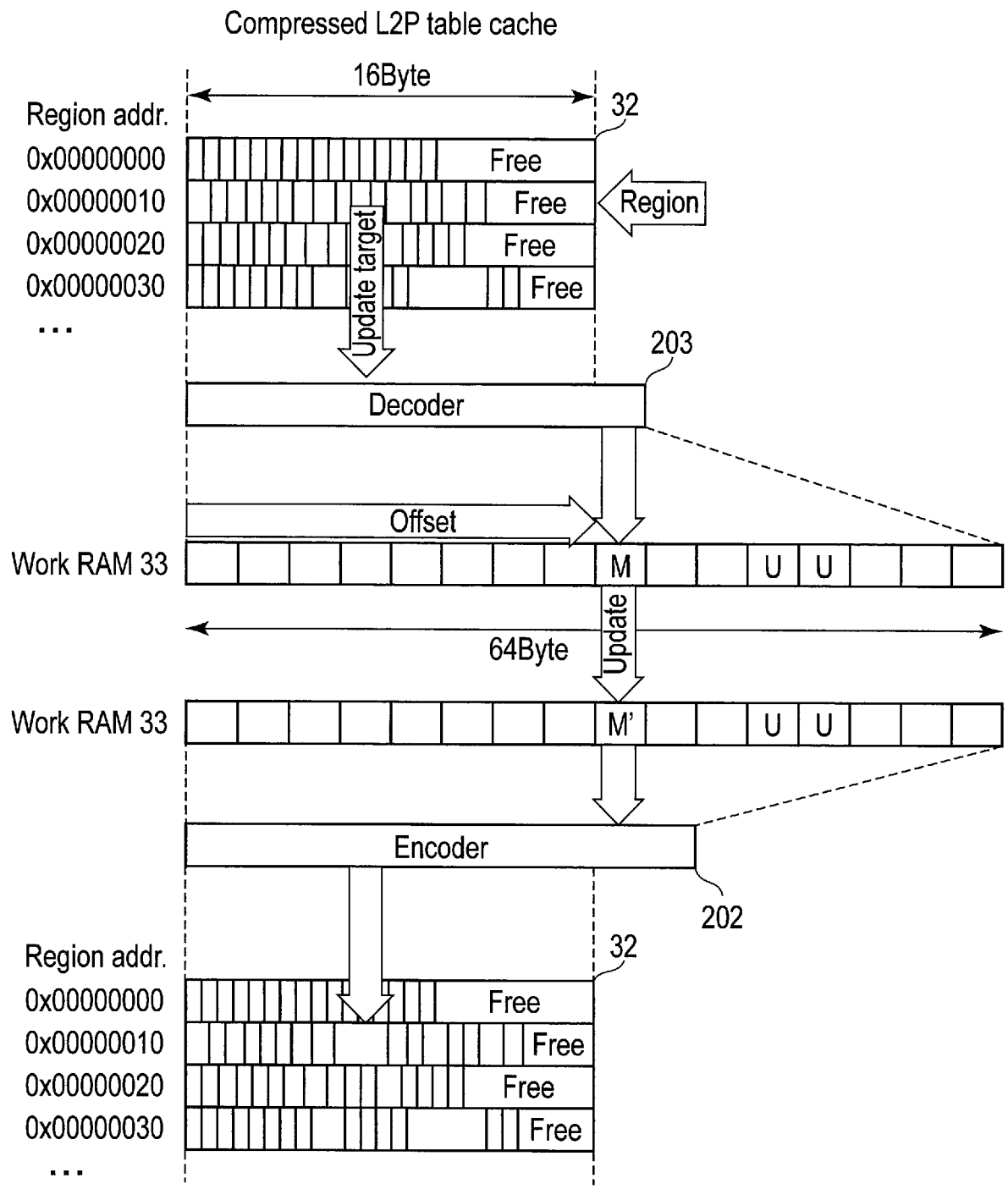
F I G. 11

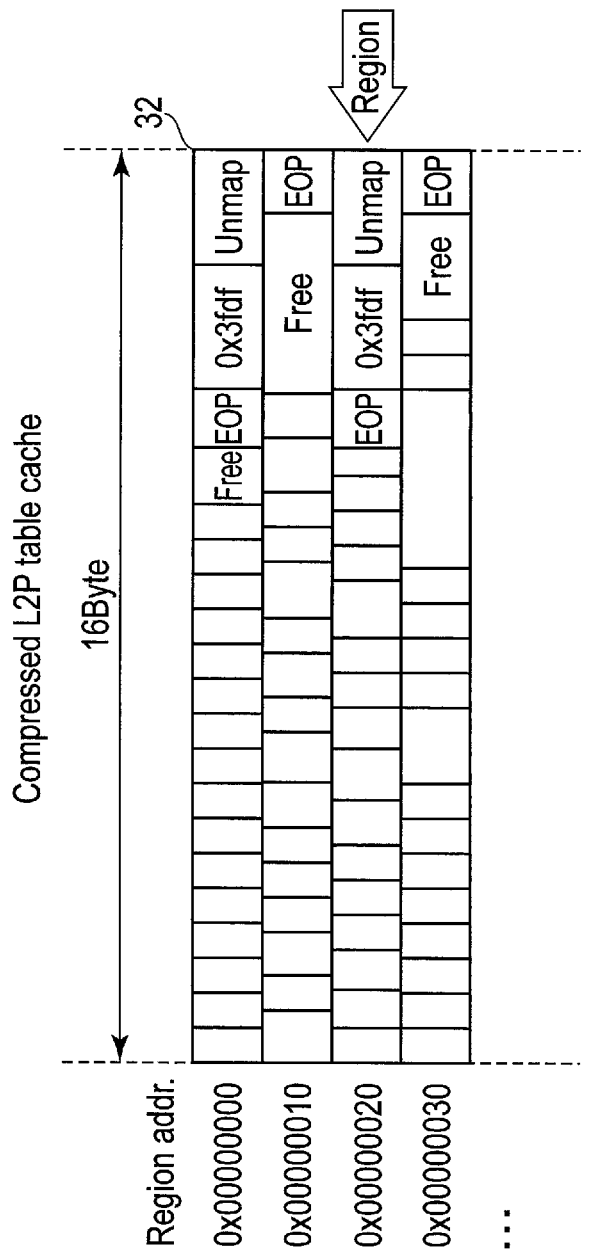
F I G. 18

MEMORY SYSTEM INCLUDING LOGICAL-TO-PHYSICAL ADDRESS TRANSLATION TABLE IN A FIRST CACHE AND A COMPRESSED LOGICAL-TO-PHYSICAL ADDRESS TRANSLATION TABLE IN A SECOND CACHE

CROSS-REFERENCE TO RELATED APPLICATIONS

This application is based upon and claims the benefit of priority from Japanese Patent Application No. 2019-051550, filed Mar. 19, 2019, the entire contents of which are incorporated herein by reference.

FIELD

Embodiments described herein relate generally to technology of controlling a nonvolatile memory.

BACKGROUND

In recent years, memory systems comprising nonvolatile memories have been widely prevalent.

A solid state drive (SSD) including a NAND flash memory is known as such a memory system.

In the memory system, logical-to-physical address translation for translating a logical address into a physical address of a nonvolatile memory is executed by using an address translation table. If the time required for referring to the address translation table and the like becomes longer, degradation in performance of the memory system may occur.

BRIEF DESCRIPTION OF THE DRAWINGS

FIG. 1 is a block diagram illustrating a configuration example of an information processing system including a memory system according to embodiment.

FIG. 3 is a diagram illustrating a configuration example of a logical-to-physical address translation table (L2P table) in the memory system of the embodiment.

FIG. 4 is a diagram illustrating a configuration example of a logical-to-physical address translation table cache (L2P table cache) in the memory system of the embodiment.

FIG. 8 is a diagram illustrating an example of a content of each entry of the compressed L2P table cache storing no metadata.

FIG. 9 is a diagram illustrating an unmap check operation executed by using the compressed L2P table cache storing no metadata.

FIG. 11 is a diagram illustrating address update operation executed by using the compressed L2P table cache storing no metadata.

FIG. 18 is a diagram illustrating an unmap check operation executed by using the compressed L2P table cache storing the metadata.

DETAILED DESCRIPTION

Figure 2:
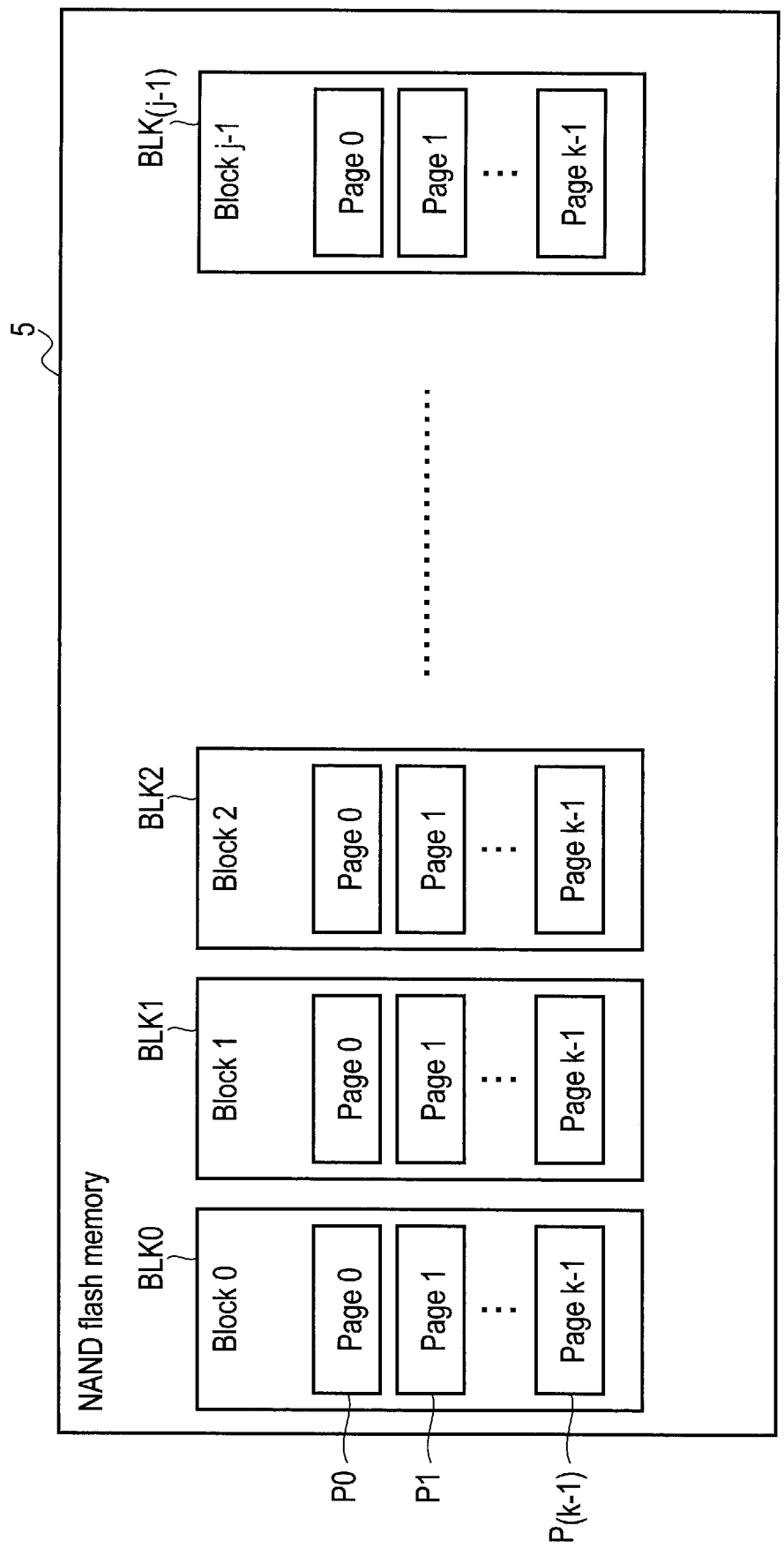
FIG. 2 is a diagram illustrating a configuration example of a nonvolatile memory in the memory system of the embodiments.

Various embodiments will be described hereinafter with reference to the accompanying drawings.

In general, according to one embodiment, a memory system connectable to a host, comprises a nonvolatile memory, and a controller electrically connected to the nonvolatile memory and configured to store a part of a logical-to-physical address translation table stored in the nonvolatile memory, as a first cache, in a random-access memory, and to store a compressed logical-to-physical address translation table obtained by compressing the logical-to-physical address translation table, as a second cache, in the random-access memory. In a case where first address translation data including a first physical address of the nonvolatile memory corresponding to a first logical address designated by the host does not exist in the first cache and first compressed address translation data obtained by compressing the first address translation data exists in the second cache, the controller executes an operation of storing uncompressed address translation data obtained by de-compressing the first compressed address translation data, in the first cache, and an operation of retrieving the first physical address from the uncompressed address translation data. The controller stores first information indicative of a part of the first address translation data in a first area of a first entry of the second cache. The first entry is an entry where the first compressed address translation data is stored. The first area is an area other than an area used as the compressed logical-to-physical address translation table. When executing processing of checking a part of the first address translation data which does not exist in the first cache, the controller refers to the first information stored in the first entry of the second cache.

First, a configuration of an information processing system 1 including a memory system according to the embodiment will be described with reference to FIG. 1.

This memory system is a storage device configured to write data to a nonvolatile memory and to read data from the nonvolatile memory. This memory system may be implemented as, for example, a solid state drive (SSD) or a memory card. This memory system is assumed to be implemented as a solid state drive (SSD) 3 in the following descriptions.

The information processing system 1 includes a host (a host device) 2, and the SSD 3. The host 2 may be a personal computer, a server, a cellular telephone, a photographic device, a portable terminal such as a tablet or a smartphone, a game console, or a vehicle-mounted terminal such as a car navigation system.

The SSD 3 can be used as an external storage device of the information processing apparatus which functions as the host 2. The SSD 3 may be built in the information processing apparatus or connected to the information processing apparatus via a cable or a network.

As the interface for interconnection between the host 2 and the SSD 3, SCSI, Serial Attached SCSI (SAS), ATA, Serial ATA (SATA), PCI Express (PCIe), Ethernet (registered trademark), Fibre channel, NVM Express (NVMe) (registered trademark), universal serial bus (USB), Mobile Industry Processor Interface (MIPI), UniPro, and the like, can be used.

The SSD 3 includes a controller 4 and a nonvolatile memory (NAND flash memory) 5. The NAND flash memory 5 is not limited but may include plural NAND flash memory chips. The controller 4 is electrically connected to the NAND flash memory 5 and operates as a memory controller configured to control the NAND flash memory 5. The controller 4 may be realized by a circuit such as a System-on-a-chip (SoC).

The NAND flash memory 5 stores user data 7, and management information such as a logical-to-physical address translation table (L2P table) 7. The logical-to-physical address translation table 8 is hereinafter simply referred to as an L2P table 8. The L2P table 8 manages mapping between the logical addresses designated by the host 2 to access the SSD 3 and the physical addresses of the NAND flash memory 5. The logical address is an address used by the host 2 to designate an address of the location in the logical address space. A physical address corresponding to a certain logical address is indicative of a physical storage location in the NAND flash memory 5 where data corresponding to the logical address is stored.

The logical-to-physical address translation table 8, i.e., the L2P table 8 is used for a logical-to-physical address translation of translating a logical address designated by the host 2 into a physical address indicative of a physical storage location in the NAND flash memory 5 where latest data corresponding to this logical address is stored.

The NAND flash memory 5 includes one or more NAND flash memory chips, each of which including a memory cell array. The memory cell array comprises a plurality of memory cells arrayed in a matrix. The memory cell array of the NAND flash memory 5 includes plural blocks (physical blocks) BLK 0 to BLK (j−1) as illustrated in FIG. 2. The blocks BLK 0 to BLK (j−1) function as a unit of an erase operation.

The blocks BLK 0 to BLK (j−1) include plural pages (physical pages). In other words, each of the blocks BLK 0 to BLK (j−1) includes pages P0, P1, . . . , P(k−1). Each of the pages includes plural memory cells connected to the same word line. In the NAND flash memory 5, reading of data and writing of data are executed in a unit of a page.

In FIG. 1, the controller 4 can function as a flash translation layer (FTL) configured to execute data management of the NAND flash memory 5 and block management of the NAND flash memory 5.

The data management includes (1) management of mapping information indicative of the correspondence between logical addresses and physical addresses, (2) processing for concealing restrictions (for example, read/write operations in page units and erase operations in block units) in the NAND flash memory 5, and the like. The mapping management between the logical addresses and the physical addresses is executed by using the L2P table 8.

The controller 4 manages mapping between the logical addresses and the physical addresses in units of predetermined management sizes, by using the L2P table 8. The management size is not limited to this but, for example, a cluster may be used. The cluster is a unit of designating a location in the logical address space. One cluster includes consecutive sectors (for example, eight sectors, sixteen sectors, thirty-two sectors, or the like). One cluster is not limited to this, but one cluster is assumed to include eight sectors in the following descriptions. In this case, if the size of one sector is 512 bytes, the size of one cluster is 4 Kbytes (4 KB). The L2P table 8 may manage the mapping between the logical addresses and the physical addresses in units of 4 KB clusters.

The logical address designating a certain cluster is called a logical cluster address (LCA), and a physical address corresponding to a certain logical cluster address (LCA) is called a media cluster address (MCA).

Writing of data to a page can be executed only once per erase cycle. For this reason, the controller 4 writes update data (i.e., modified data) corresponding to a certain logical address to a physical location different from a physical location where previous data corresponding to this logical address is stored. Then, the controller 4 associates the logical address with the other physical storage location by updating the L2P table 8, and thereby invalidates the previous data.

The block management includes management of defective blocks (bad blocks), wear leveling, garbage collection, and the like. Wear leveling is the operation for leveling the wear of blocks.

The garbage collection is an operation of increasing the number of free blocks. The free block is a block including no valid data. In the garbage collection, the controller 4 copies valid data in several blocks where the valid data and invalid data are mixed to another block (for example, a free block). The valid data means data associated with the certain logical address. For example, data referred to by the L2P table 8 (i.e., data associated with a logical address as latest data) is valid data and may be read later by the host 2. The invalid data means data which is not associated with any logical addresses. The data which is not associated with any logical addresses is data which may not be read any more by the host 2. Then, the controller 4 updates the L2P table 8 and maps the physical addresses of copy destination to logical addresses of the copied valid data, respectively. A block which only contains invalid data after valid data have been copied to another block is released as a free block. The block can be thereby reused for writing of data after an erase operation on this block is executed.

The host 2 sends various commands to SSD 3. The commands include read command, write command, unmap command, and the like. The read command is a command to request the SSD 3 to read data. The read command includes a logical address (starting LBA) corresponding to data to be read, and a length of the data to be read.

When the controller 4 receives the read command from the host 2, the controller 4 retrieves a physical address corresponding to the starting LBA in the read command by referring to the L2P table 8. The controller 4 reads data from a physical storage location of the NAND flash memory 5, which corresponds to the acquired physical address, and returns the read data to the host 2.

A write command is a command to request the SSD 3 to write data. The write command includes a logical address (starting LBA) of write data (i.e., data to be written), and a length of the write data. The controller 4 writes the write data to an available physical storage location in the NAND flash memory 5. Furthermore, the controller 4 maps a physical address corresponding to the physical storage location to which the write data is written, to a logical address corresponding to the write data, by updating the L2P table 8.

The controller 4 uses a memory area in the random-access memory such as DRAM 6 as an L2P table cache 31 which caches a part of contents of the L2P table 8. In other words, the controller 4 stores, in a random-access memory such as DRAM 6, a part of contents of the L2P table 8 as the logical-to-physical address translation table (hereinafter referred to as the L2P table cache) 31. The controller 4 executes a logical-to-physical address translation for translating a logical address designated by the host 2 into a physical address of the NAND flash memory 5 by using the L2P table cache 31.

In the embodiment, in order to efficiently use the memory area of the random-access memory such as DRAM 6, the controller 4 use this memory area as two types of caches, i.e., the L2P table cache 31 and a compressed logical-to-physical address translation table cache (hereinafter referred to as compressed L2P table cache) 32.

In other words, the controller 4 stores, in a random-access memory such as DRAM 6, not only a part of the contents of the L2P table 8 as the L2P table cache 31, but also contents of the compressed logical-to-physical address translation table cache obtained by compressing the contents of the L2P table 8, as the compressed L2P table cache 32.

The L2P table cache 31 includes plural entries (plural cache lines), and each of the entries stores address translation data. The address translation data stored in one entry may include plural physical addresses of the NAND flash memory 5 corresponding to plural consecutive logical addresses, respectively. In general, since access to the NAND flash memory 5 has spatial locality, the configuration of the L2P table cache 31 including plural entries each storing the plural physical addresses corresponding to plural consecutive logical addresses enables a cache hit rate to be increased.

The compressed L2P table cache 32 is used to cache compressed address translation data obtained by compressing the contents of the L2P table 8. The compressed L2P table cache 32 includes plural entries (i.e., plural cache lines). The number of entries of the compressed L2P table cache 32 may be more than the entries included in the L2P table cache 31.

The compressed address translation data stored in one entry of the compressed L2P table cache 32 may include plural physical addresses of the NAND flash memory 5 corresponding to plural consecutive logical addresses, respectively.

The size of the compressed address translation data for one entry of the compressed L2P table cache 32 is approximately equivalent to one severalth of the size of the address translation data for one entry of the L2P cache 31. Therefore, the compressed L2P table cache 32 can store the compressed address translation data for logical-to-physical address translation corresponding to more logical addresses, in a little memory capacity.

The controller 4 caches a part of the contents of the L2P table 8 in the L2P table cache 31, and caches the compressed address translation data obtained by compressing the contents of the L2P table 8 in the compressed L2P table cache 32.

When the controller 4 receives a read request (read command) from the host 2, the controller 4 executes a logical-to-physical address translation operation described below.

First, the controller 4 determines whether or not address translation data including the physical address of the NAND flash memory 5 corresponding to a logical address designated by the read request received from the host 2 exists in the L2P table cache 31 (cache hit check). If this address translation data does not exist in the L2P table cache 31 (cache miss), the controller 4 determines whether or not compressed address translation data corresponding to this address translation data exists in the compressed L2P table cache 32 (compressed cache hit check). If this compressed address translation data exists in the compressed L2P table cache 32 (compressed cache hit), the controller 4 executes the logical-to-physical address translation by using this compressed address translation data of the compressed L2P table cache 32.

In a configuration which does not comprise the compressed L2P table cache 32, if cache miss of the L2P table cache 31 occurs, the controller 4 needs to read address translation data corresponding to the designated logical address from the L2P table 8 in the NAND flash memory 5. For this reason, much time is required to perform the logical-to-physical address translation.

In the embodiment, the compressed L2P table cache 32 exists on the DRAM 6 accessible at a higher speed than the NAND flash memory 5. Therefore, in a case where a cache miss of the L2P table cache 31 occurs, the compressed address translation data including the physical address indicative of the physical storage location of the NAND flash memory 5 where the data corresponding to the designated logical address is stored, can be rapidly retrieved from the compressed L2P table cache 32.

If a cache miss of the L2P table cache 31 occurs and then if a cache miss (compressed cache miss) of the compressed L2P table cache 32 occurs, the controller 4 reads the address translation data corresponding to the designated logical address from the L2P table 8 in the NAND flash memory 5. In this case, the controller 4 stores the read address translation data in the L2P table cache 31, and stores, in the compressed L2P table cache 32, compressed address translation data obtained by compressing the read address translation data in the compressed L2P table cache 32.

Next, a configuration of the controller 4 will be described.

The controller 4 includes a host interface 11, CPU 12, a dedicated hardware (HW) 13, a backend unit 14, and the like. The host interface 11, CPU 12, the dedicated hardware (HW) 13, and the backend unit 14 are interconnected via a bus 10.

The host interface 11 functions as a circuit which receives various commands such as a write command and a read command from the host 2.

The CPU 12 is a processor configured to control operations of the host interface 11, the dedicated hardware (HW) 13, the backend unit 14, and the like.

The CPU 12 executes various types of processing by executing a control program (firmware: FW) stored in ROM (not illustrated). The CPU 12 executes command processing for processing various commands received from the host 2, in addition to the above-explained FTL processing. The operations of the CPU 12 are controlled by the firmware executed by the CPU 12. Several parts or all parts of the command processing may be executed by the dedicated hardware 13.

The dedicated hardware 13 includes a compression/de-compression module 131, a DRAM interface 132, a direct memory access (DMA) controller (DMAC) 133, and the like. The compression/de-compression module 131 executes an encoding operation of compressing the address translation data to generate compressed address translation data, and an decoding operation of de-compressing the compressed address translation data to generate original uncompressed address translation data.

The compression/de-compression module 131 includes a RAM-side interface which executes communications with the DRAM interface 132 and a DRAM-side interface which executes communications with the DMAC 133. The DRAM interface 132 functions as a DRAM control circuit which controls DRAM 6. The memory area of DRAM 6 may function as not only the L2P table cache 31 and the compressed L2P table cache 32, but also the work RAM 33. The controller 4 may include SRAM, and this SRAM may function as the work RAM 33.

DMAC 133 controls data transfer (DMA transfer) between the NAND flash memory 5 and DRAM 6. When the address translation data of the L2P table 8 is to be transferred to the compressed L2P table on the DRAM 6, the address translation data is transferred from the DMAC 133 to the compression/de-compression module 131 and the address translation data is compressed by the compression/de-compression module 131.

The compressed address translation data is stored in the compressed L2P table on the DRAM 6 via the DRAM interface 132. When the compressed address translation data of the compressed L2P table 32 on the DRAM 6 is to be transferred to the L2P table 8 on the NAND flash memory 5 or the L2P table cache 31 on the DRAM 6, the compressed address translation data is transferred from the DRAM interface 132 to the compression/de-compression module 131 under control of the DMAC 133, and the compressed address translation data is de-compressed by the compression/de-compression module 131. The original uncompressed address translation data can be thereby obtained.

The obtained uncompressed address translation data is transferred to the NAND flash memory 5 or the DRAM 6 under control of the DMAC 133.

The backend unit 14 includes an encoding/decoding unit 141 and a NAND interface 142. The encoding/decoding unit 141 can function as, for example, an error-correcting code (ECC) encoder and an ECC decoder. When the data is to be written to the NAND flash memory 5, the encoding/decoding unit 141 encodes (ECC-encodes) write data to be written and adds an error-correcting code (ECC) to the data. When the data is read from the NAND flash memory 5, the encoding/decoding unit 141 executes error correction of the read data by using ECC added to the read data.

The NAND interface 142 functions as a NAND control circuit configured to control the NAND flash memory 5. The NAND interface 142 may be connected to the NAND flash memory 5 over plural channels.

FIG. 3 illustrates a configuration example of the L2P table 8.

The logical address space used by the host 2 to access the SSD 3 is divided into plural address areas (hereinafter called regions). Each region includes plural consecutive logical addresses.

The L2P table 8 includes plural entries corresponding to plural regions, respectively. In the example illustrated in FIG. 3, the logical address space is divided into M+1 regions. These M+1 regions includes a region having region address 0 (Region addr.=0), a region having region address 1 (Region addr.=1), a region having region address 2 (Region addr.=2), . . . , a region having region address M (Region addr.=M). In this case, the L2P table 8 includes M+1 entries.

Each entry stores plural physical addresses corresponding to plural logical addresses belonging to the region corresponding to this entry, as the address translation data. In other words, the address translation data in each entry includes plural physical addresses corresponding to the region corresponding to plural logical addresses. As described above, these physical addresses may be media cluster addresses (MCAs).

The address translation data corresponding to one region includes, for example, sixteen MCAs. One MCA has the size of, for example, 4 bytes. In this case, the address translation data corresponding to one region has the size of 64 bytes.

The logical address designated by the host 2 is divided into (i) a region address indicative of the region to which this logical address belongs and (ii) an offset within this region. For example, when the logical address (LCA) is assumed to be represented as 32 bits (LCA [b31:b0]), [b31:b3] of LCA [b31:b0] is used as the region address and [b3:b0] of LCA [b31:b0] is used as the offset.

On the L2P table 8, an entry corresponding to a certain region address stores sixteen MCAs corresponding to sixteen offset locations+0 to +15, respectively.

FIG. 4 illustrates a configuration example of the L2P table cache 31.

The L2P table cache 31 includes N+1 entries (N+1 cache lines). In general, N+1 is smaller than the number (=M+1) of all regions. Each entry of the L2P table cache 31 includes an ID field and a tag field.

The ID field is indicative of an identifier of the entry. The tag field is indicative of which region's address translation data (sixteen physical addresses) are stored in this entry.

For example, tag field "0" associated with a certain entry indicates that the address translation data corresponding to a region having the region address=0 is stored in this entry, and tag field "2" associated with a certain entry indicates that the address translation data corresponding to a region having the region address-2 is stored in this entry.

Each entry of the L2P table cache 31 stores sixteen MCAs corresponding to sixteen offset locations +0 to +15.

Figures 5, 6:
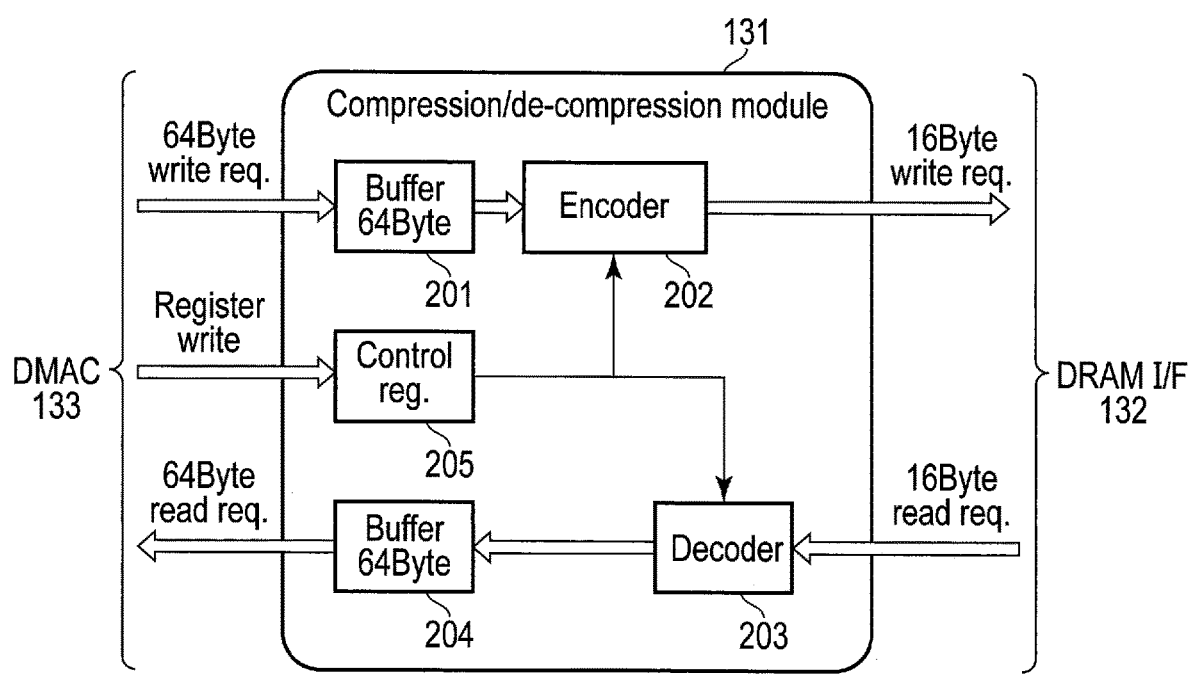
FIG. 5 is a diagram illustrating a configuration example of a compressed logical-to-physical address translation table cache (compressed L2P table cache) in the memory system of the embodiment.
FIG. 6 is a block diagram illustrating a configuration example of a compression/de-compression module which does not comprise a metadata generating function.

FIG. 5 illustrates a configuration example of the compressed L2P table cache 32.

The compressed L2P table cache 32 may include the same number of entries (M+1 entries) as the number of the entries of the L2P table 8. In this case, M+1 entries correspond to M+1 region addresses 0 to M, respectively.

Each entry of the compressed L2P table cache 32 stores compressed address translation data (Compressed Data) obtained by compressing the address translation data including sixteen MCAs corresponding to sixteen consecutive logical addresses belonging to the region corresponding to this entry. After all the regions have been read-accessed by the host 2, the compressed L2P table cache 32 become a state where the compressed address translation data are stored in all of M+1 entries of the compressed L2P table cache 32. For this reason, the controller 4 can rapidly execute the logical-to-physical address translation operation by only reading the compressed L2P table cache 32 on the DRAM 6 without reading the L2P table 8 on the NAND flash memory 54.

FIG. 6 illustrates a configuration example of a compression/de-compression module which does not comprise the metadata generating function.

The metadata generating function is a function of additionally storing uncompressed metadata in a free area (i.e., blank area) of each entry of the compressed L2P table cache 32 which is generated by compressing the address translation data. The compressed L2P table cache 32 is capable of storing all compressed address translation data for logical-to-physical address translation for all region (i.e., all the logical addresses) of the SSD 3 but, in general, even if only a part of the contents of the original address translation data corresponding to a certain compressed address translation data in the compressed L2P table cache 32 is to be checked (or searched), the entire compressed address translation data needs to be de-compressed.

In addition, when the contents of the compressed L2P table cache 32 are updated, too, it is necessary to de-compress the compressed address translation data of the update target, then update the de-compressed compressed address translation data, and compress the de-compressed address translation data again.

The metadata generated by the above-described metadata generating function is information indicative of a part of contents of the original address translation data corresponding to the compressed address translation data. The compressed address translation data is stored in one of the entries of the compressed L2P table cache 32 together with the metadata indicative of a part of the contents of the original address translation data. The metadata is generated based on the contents of the original address translation data when the original address translation data is compressed.

FIG. 6 illustrates a configuration example of the compression/de-compression module 131 which does not comprise the metadata generating function.

The compression/de-compression module 131 compresses address translation data corresponding to one region to generate compressed address translation data for the one region, and stores, in the DRAM 6, the compressed address translation data for the one region as the compressed L2P table cache 32.

As described above, the address translation data for one region is composed of sixteen MCAs each having the size of 4 bytes. That is, the address translation data for one region is composed of data having the total size of 64 bytes. For this reason, the size of each entry of the L2P table cache 31 is, for example, 64 bytes.

In the compression/de-compression module 131, a target compression rate is set to, for example, ¼. In this case, the compression/de-compression module 131 compresses 64-byte address translation data to generate compressed address translation data having the size of 16 bytes or less. For this reason, the size of each entry of the compressed L2P table cache 32 is, for example, 16 bytes, and smaller than the size of each entry of the L2P table cache 31. In addition, the compression/de-compression module 131 de-compresses the compressed address translation data of 16 bytes or less to generate 64-byte address translation data (uncompressed address translation data).

The compression/de-compression module 131 comprises a buffer 201, an encoder 202, a decoder 203, a buffer 204, a control register 205, and the like.

The buffer 201 temporarily stores 64-byte address translation data received from the DMAC 133. The 64-byte address translation data is data associated with a 64-byte write request received from the DMAC 133. The encoder 202 compresses the 64-byte address translation data. For example, the encoder 202 divides the 64-byte address translation data stored in the buffer 201 into plural data portions (for example, sixteen data portions) each having a predetermined size (for example, 4 bytes), and converts a bit pattern of each data portion into the other short bit pattern (i.e., code). Each of sixteen MCAs included in 64-byte address translation data is thereby converted into a code corresponding to the bit pattern of each MCA. In the case where the target compression rate is set to ¼, as described above, the 64-byte address translation data is compressed to 16-byte data. The 16-byte data is associated with the 16-byte write request as the compressed address translation data, and the 16-byte write request is sent to the DRAM interface 132. The 16-byte data (compressed address translation data) is stored in one of the entries of the compressed L2P table cache 32 on the DRAM 6 via the DRAM interface 132.

The decoder 203 receives 16-byte data (compressed address translation data) associated with a 16-byte read request from the DRAM interface 132 and de-compresses the compressed address translation data.

The original 64-byte address translation data obtained by de-compressing the compressed address translation data is stored in the buffer 204. Then, the 64-byte read request associated with the 64-byte address translation data stored in the buffer 204 is sent to the DMAC 133.

The control register 305 is used by the firmware to control operations of each of the encoder 202 and the decoder 203.

Figure 7:
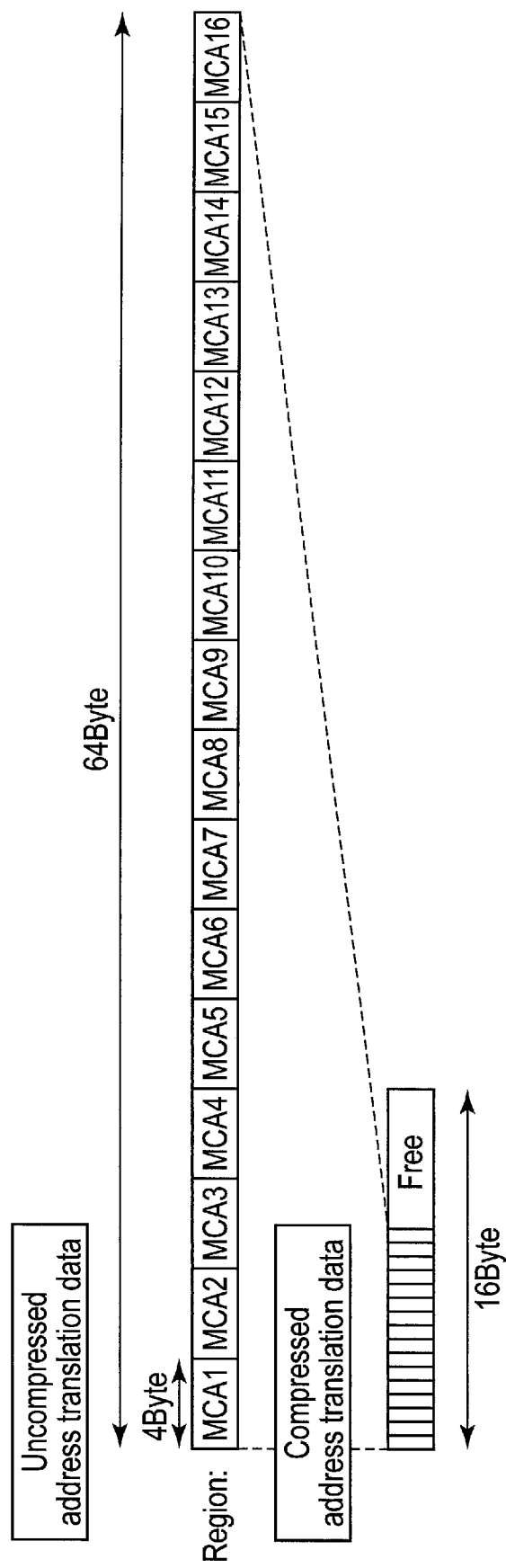
FIG. 7 is a diagram illustrating a relationship between uncompressed address translation data and compressed address translation data storing no metadata.

FIG. 7 illustrates a relationship between the uncompressed address translation data and the compressed address translation data.

As illustrated at an upper part of FIG. 7, the address translation data (uncompressed address translation data) corresponding to one region includes sixteen MCAs (MCA1, MCA2, . . . , MCA16). Since each MCA has the size of 4 bytes as described above, the uncompressed address translation data corresponding to one region has the size of 64 bytes.

A lower part of FIG. 7 illustrates the compressed address translation data obtained by compressing the uncompressed address translation data by the encoder 202. The size of the compressed address translation data is 16 bytes at maximum. The size of the actually compressed address translation data is often less than a quarter of the size of the address translation data to be compressed, in accordance with the value of each of sixteen MCAs included in the uncompressed address translation data. Therefore, the compressed address translation data having the size of less than 16 bytes is often generated. For example, when the 64-byte uncompressed address translation data is compressed to have a 10-byte size, a data portion from the beginning of the 16-byte compressed address translation data to 10 bytes is a significant data portion. A remaining 6-byte data portion subsequent with the significant data portion becomes a free area (blank) including no significant data. The free area may be filled with padding. In FIG. 7, the free area of the 16-byte compressed address translation data is represented as "Free".

FIG. 8 illustrates an example of a content of each entry of the compressed L2P table cache 32.

In FIG. 8, "0x" is indicative of a hexadecimal notation. If each of the regions includes sixteen consecutive logical addresses, [b31:b3] of LCA [b31:b0], i.e., upper 28 bits of the LCA are used as the region address while lower 4 bits of the LCA are used as the offset.

Each entry of the compressed L2P table cache 32 stores the compressed address translation data obtained by compressing the uncompressed address translation data corresponding to the region corresponding to this entry. Each entry of the compressed L2P table cache 32 has the size of 16 bytes. The sizes of the free areas are different in accordance with the compression rate of the address translation data of each region. The compressed address translation data of less than 16 bytes is stored in one of the entries of the compressed L2P table in a state where a free area exists at its end. The free area is an area other than the area used as the compressed logical-to-physical address translation table of this entry. In general, the free area is filled by padding the area with a bit pattern such as all "0".

As described above, since the compressed L2P table cache 32 can store the compressed address translation data for logical-to-physical address translation for all the logical addresses of the SSD 3, the compressed L2P table cache 32 is useful to refer to or search the contents of the address translation data for all the logical addresses of the SSD 3.

However, since the address translation data in the compressed L2P table cache 32 is compressed, the compressed address translation data needs to be de-compressed as described above, even if only a part of the contents of the original address translation data corresponding to the compressed address translation data in the compressed L2P table cache 32 is to be checked (or searched).

An example of the processing of checking a part of the contents of the original address translation data is not limited to this, but may be unmap search, or the like. The unmap search is the processing of checking whether or not valid data corresponding to a logical address designated by the host 2 is stored in the NAND flash memory 5. The unmap search is also called an unmap check operation.

In each of the address translation data of the L2P table 8 and the address translation data of the L2P table cache 31, the MCA value which is not mapped to the logical address is represented by a specific bit pattern such as all "1". A specific bit pattern such as all "1" is indicative of MCA which is not used to store data. In other words, a specific bit pattern such as all "1" is used to identify a logical address to which the physical address of the NAND flash memory 5 is not allocated.

In addition, in a case where the compressed address translation data corresponding to a certain region in the compressed L2P table cache 32 needs to be updated, the processing of de-compressing this compressed address translation data to obtain the original address translation data (i.e., uncompressed address translation data corresponding to this region), the processing of updating the original address translation data such that a certain MCA in the original address translation data is overwritten by the other MCA, and the operation of compressing again the updated address translation data need to be executed as described above.

Such an address update operation is required when, for example, the user data is written to the NAND flash memory 5 or the valid data is copied from a certain physical storage location on the NAND flash memory 5 to the other physical storage location by the garbage collection.

The unmap search will be explained with reference to FIG. 9.

In the unmap search, first, from the logical address (logical cluster address: LCA) designated by the host 2, (i) a region address of a region to which this LCA belongs, and (ii) an offset (region offset) in this region are computed. In this case, lower 4 bits of this LCA are computed as the offset while upper bits excluding lower 4 bits are computed as the region address of the region to which this LCA belongs.

When the address translation data corresponding to the computed region address does not exist in the L2P table cache 31, the compressed address translation data corresponding to the computed region address is read from the compressed L2P table cache 32. The read compressed address translation data is de-compressed by the decoder 203, and the uncompressed address translation data obtained by de-compressing the read compressed address translation data is stored in the work RAM 33. Then, one MCA of sixteen MCAs included in the uncompressed address translation data is specified based on the computed offset. If the specified MCA has a specific bit pattern such as all "1" (in FIG. 9, the MCA having a specific bit pattern is represented as "U"), the LCA designated by the host 2 is determined to be the MCA (unmap) to which the physical address is not allocated.

Figure 10:
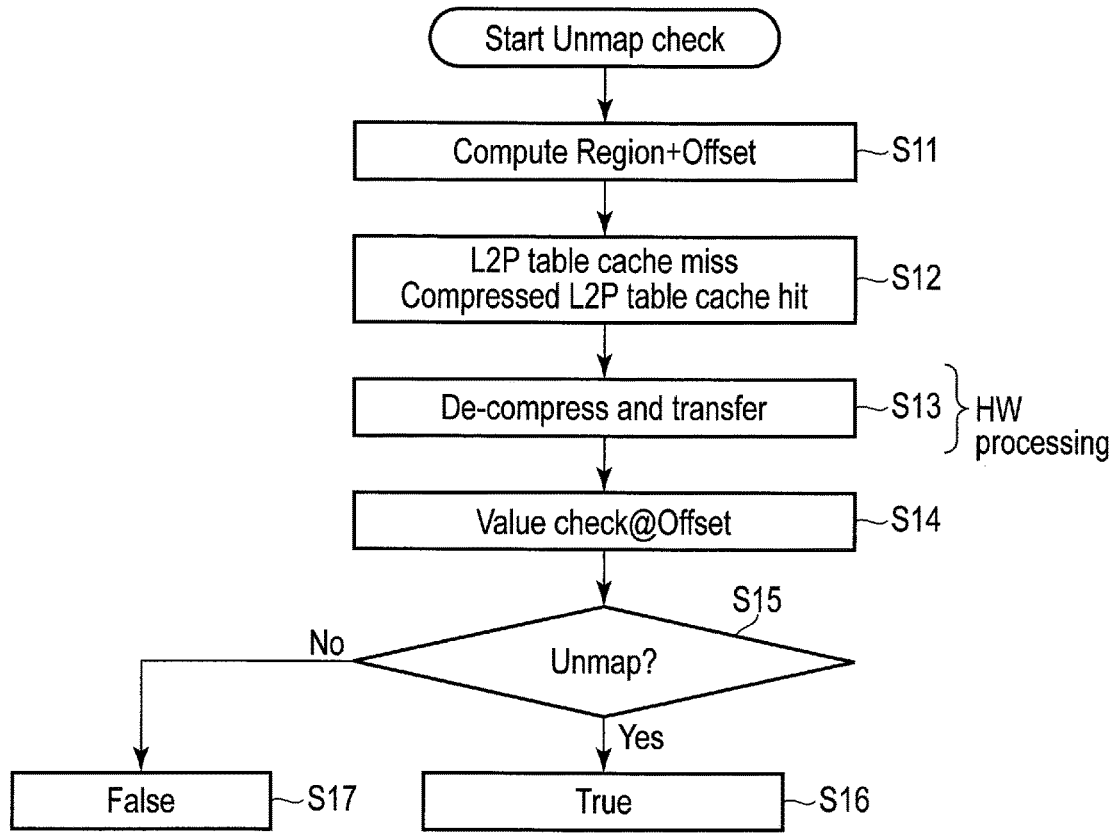
FIG. 10 is a flowchart illustrating a procedure of the unmap check operation executed by using the compressed L2P table cache storing no metadata.

The flowchart of FIG. 10 illustrates a procedure of the unmap search (unmap check).

First, from the logical address (logical cluster address: LCA) designated by the host 2, a region address of the region to which the logical address belongs and an offset in this region are computed (step S11). The CPU 12 determines whether or not the address translation data corresponding to the computed region address exists in the L2P table cache 31 and whether or not the compressed address translation data corresponding to the computed region address exists in the compressed L2P table cache 32 (step S12).

In a case where the address translation data corresponding to the computed region address does not exist in the L2P table cache 31 (L2P table cache miss) and the compressed address translation data corresponding to the computed region address exists in the compressed L2P table cache 32 (compressed L2P table cache hit), the CPU 12 de-compresses the compressed address translation data corresponding to the computed region address by using the decoder 203 of the compression/de-compression module 131 (step S13).

In step S13, the compression/de-compression module 131 executes a de-compressing and transferring operation including (i) the operation of reading the compressed address translation data corresponding to the computed region address from the compressed L2P table cache 32, (ii) the operation of de-compressing the read compressed address translation data to obtain the original uncompressed address translation data, and (iii) the operation of storing the original uncompressed address translation data in the work RAM 33, under control of the CPU 12. On the work RAM 33, sixteen MCAs included in the uncompressed address translation data are arranged in order of their offset locations.

The CPU 12 checks the value of the MCA at the offset location designated by the computed offset (step S14). If this MCA value has a specific bit pattern (for example, a bit pattern of all "1") indicative of unmap (YES in step S15), the CPU 12 determines that the LCA designated by the host 2 is the LCA (unmap) to which the physical address is not allocated (step S16). If this MCA value does not have a specific bit pattern (for example, a bit pattern of all "1") (NO in step S15), the CPU 12 determines that the LCA designated by the host 2 is not the LCA (unmap) to which the physical address is not allocated (step S17).

Thus, in the unmap search, the controller 4 needs to execute the control of the decoder 203 which is hardware and search for the work RAM 33.

Next, the address update operation will be explained with reference to FIG. 11.

When MCA corresponding to a certain LCA is to be updated, a region address of a region to which the LCA belongs and the offset in this region are computed from this LCA. Then, the compressed address translation data is read from the entry in the compressed L2P table cache 32 corresponding to the computed region address, as the compressed address translation data of the check target. The read compressed address translation data is de-compressed by the decoder 203, and uncompressed address translation data obtained by de-compressing the compressed address translation data is stored in the work RAM 33.

One of sixteen MCAs included in the uncompressed address translation data is specified based on the computed offset. The specified MCA value (represented as "M" in FIG. 11) is updated to a new MCA value ("M'" in FIG. 11).

The uncompressed address translation data in which the value of the specified MCA is updated is compressed by the encoder 202. Compressed address translation data obtained by compressing the updated uncompressed address translation data is stored again in the entry of the compressed L2P table cache 32 corresponding to the computed region address.

Figure 12:
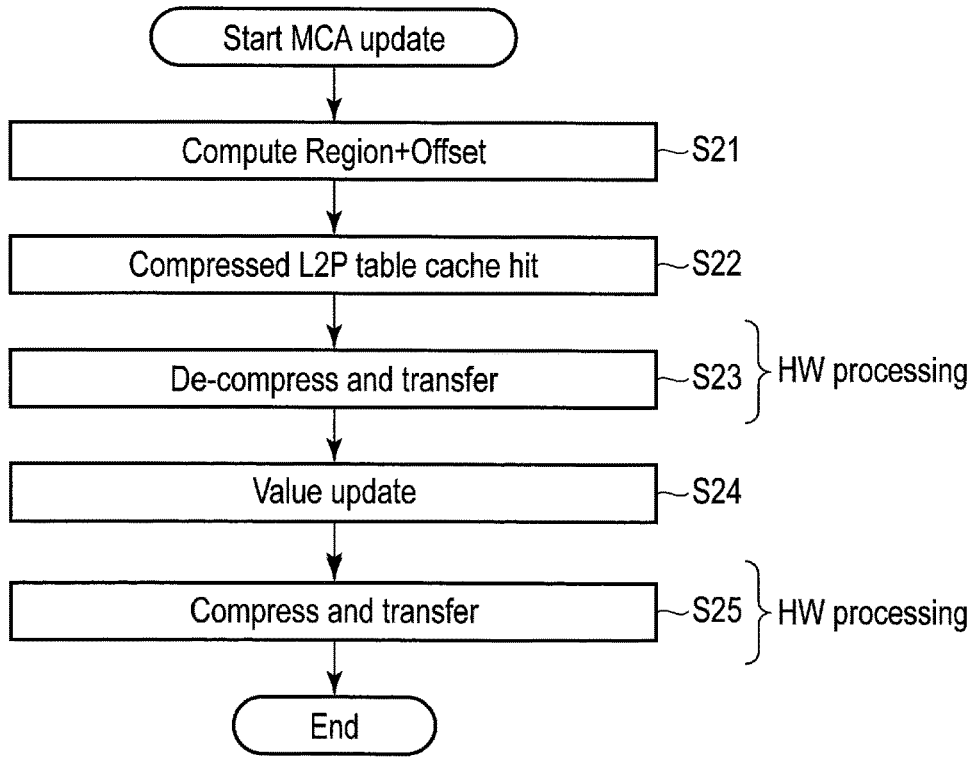
FIG. 12 is a flowchart illustrating a procedure of the address update operation executed by using the compressed L2P table cache storing no metadata.

The flowchart of FIG. 12 illustrates the procedure of an address update (MCA update) operation.

When MCA corresponding to certain LCA is to be updated, first, the CPU 12 computes a region address of a region to which the LCA belongs and the offset in this region, from the LCA (step S21). The CPU 12 determines whether or not the compressed address translation data corresponding to the computed region address exists in the compressed L2P table cache 32 (step S22).

In a case where the compressed address translation data corresponding to the computed region address exists in the compressed L2P table cache 32 (compressed L2P table cache hit), the CPU 12 de-compresses the compressed address translation data corresponding to the computed region address by using the decoder 203 of the compression/de-compression module 131 (step S23). In step S23, the compression/de-compression module 131 executes a de-compressing and transferring operation including (i) the operation of reading the compressed address translation data corresponding to the computed region address from the compressed L2P table cache 32, (ii) the operation of de-compressing the read compressed address translation data to obtain original uncompressed address translation data, and (iii) the operation of storing the original uncompressed address translation data in the work RAM 33, under control of the CPU 12. On the work RAM 33, sixteen MCAs included in the uncompressed address translation data are arranged in order of their offset locations.

The CPU 12 updates the value of the MCA at the offset location designated by the computed offset (step S24). The CPU 12 compresses again the uncompressed address translation data in which the MCA value is updated, by using the encoder 202 (step S25). In step S25, the compression/de-compression module 131 executes compression and transfer operations including (i) an operation of compressing the uncompressed address translation data to obtain compressed address translation data and (ii) an operation of writing back the compressed address translation data to the compressed L2P table cache 32.

Thus, in the address update (MCA update), the controller 4 needs to execute the operation of de-compressing the compressed address translation data by controlling the decoder 203 and the operation of compressing again the updated address translation data by controlling the encoder 202.

Figure 13:
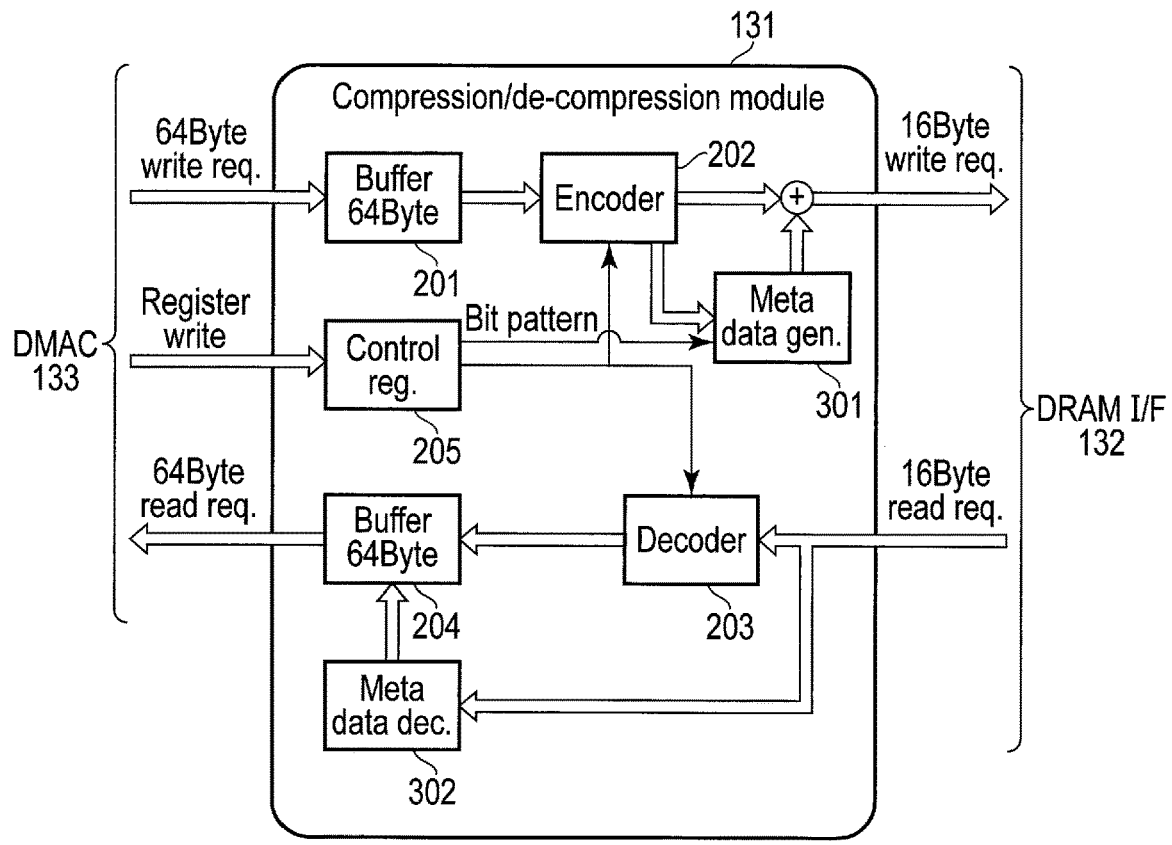
FIG. 13 is a block diagram illustrating a configuration example of a compression/de-compression module comprising the metadata generating function.

FIG. 13 illustrates a configuration example of the compression/de-compression module 131 comprising the metadata generating function.

The compression/de-compression module 131 illustrated in FIG. 13 comprises a metadata generator 301 and a metadata decoder 302 in addition to the buffer 201, the encoder 202, the decoder 203, the buffer 204, and the control register 205.

The metadata generator 301 is configured to generate, when compressing the uncompressed address translation data by the encoder 202, information capable of identifying the physical address which is included in this uncompressed address translation data and which has a specific bit pattern, as the above-described uncompressed metadata.

More specifically, in the operation of compressing the uncompressed address translation data by the encoder 202, the metadata generator 301 recognizes a quantity of the free area of the compressed address translation data, on the basis of the contents of the original uncompressed address translation data output from the encoder 202. If the sufficient free area exists, the metadata generator 301 generates metadata, on the basis of the contents of the original uncompressed address translation data, and adds the generated metadata to the end of the compressed address translation data output from the encoder 202.

As described above, the encoder 202 divides the 64-byte address translation data stored in the buffer 201 into plural data portions (for example, sixteen data parts) each having a predetermined size (for example, 4 bytes), and converts a bit pattern of each data portion into the other short bit pattern (code).

In this case, the encoder 202 may output a bit pattern of the data portion to the metadata generator 301 for each data portion (4-byte MCA). The metadata generator 301 can thereby detect the bit pattern of each MCA included in the original uncompressed address translation data. The encoder 202 may output not the bit pattern of each data part, but a bit pattern ID to identify the bit pattern to the metadata generator 301.

In this case, too, the metadata generator 301 can detect the bit pattern of each MCA included in the original uncompressed address translation data.

For example, the metadata generator 301 assigns "1" to a specific bit pattern (or specific bit pattern ID) and assigns "0" to each of the other bit patterns (or each of the other bit pattern IDs). If the bit pattern (unmap) of all "1" indicative of unmap is set as a specific bit pattern to be detected, by the control register 205, the metadata generator 301 assigns the bit "1" to the bit pattern (unmap) of all "1" and assigns the bit "0" to each of the other bit patterns.

The metadata generator 301 generates 16-bit metadata by collecting the values "1" or "0" assigned to the bit patterns received from the encoder 202. The 16 bits included in the 16-bit metadata correspond to sixteen LCAs belonging to the region corresponding to the original 64-byte address translation data, and each of the 16 bits indicates whether or not the corresponding LCA is an LCA to which the MCA is allocated.

That is, the 16-bit metadata is used as bitmap data (unmap bitmap) indicating whether or not each of sixteen LCAs corresponding to the original 64-byte address translation data is the logical address to which MCA is not allocated. In this case, in the unmap bitmap, the bit indicative of "1" indicates that MCA is not allocated to the LCA corresponding to this bit, and the bit indicative of "0" indicates that MCA is allocated to the LCA corresponding to this bit.

The generated 16-bit metadata (unmap bitmap) is added to the end (free area) of the compressed address translation data output from the encoder 202. The compressed address translation data in which the metadata are added to the end is stored in one of the entries of the compressed L2P table 32. In other words, the compressed address translation data of less than 16 bytes is stored in this entry of the compressed L2P table 32, and the metadata concerning the original address translation data corresponding to this compressed address translation data is stored in the free area of this entry as additional uncompressed information.

Thus, the compression/de-compression module 131 comprising the encoder 202 and the metadata generator 301 functions as a compression circuit for compressing the uncompressed address translation data and creating the compressed address translation data, further generates information capable of identifying the MCA included in the uncompressed address translation data and having a specific bit pattern, as the metadata, when compressing the uncompressed address translation data.

The CPU 12 can notify the metadata generator 301 of the compression/de-compression module 131 of the bit pattern to be detected, as the above-described specific bit pattern, by setting the bit pattern to be detected, in the control register 205. The CPU 12 may set the bit pattern ID to be detected, in the control register 205, and thereby notify the metadata generator 301 of the compression/de-compression module 131 of the bit pattern ID indicative of the bit pattern to be detected.

The metadata generator 301 can generate the metadata which can identify the MCA having the bit pattern specified by the CPU 12, of sixteen MCAs included in the uncompressed address translation data.

In addition, in the embodiments, the metadata added to the end of the compressed address translation data also has a function of overwriting (updating), after the compressed address translation data is de-compressed, a part of the de-compressed, compressed address translation data.

When updating one of sixteen MCAs included in the original address translation data corresponding to the compressed address translation data stored in a certain entry of the compressed L2P table cache 32, to a new MCA, the CPU 12 directly accesses this entry in the compressed L2P table cache 32 and stores metadata for MCA update in the free area of this entry. In this case, the metadata for MCA update includes both the offset value indicative of the location of the MCA of update target in the original address translation data, and a new MCA (updated MCA of the MCA of update target), the offset value and the new MCA are stored in the free area of this entry, as the metadata for MCA update. In this case, the location of the MCA of update target in the original address translation data is indicative of a location where the MCA of update target of sixteen MCAs of the entry is stored.

In the operation of de-compressing the compressed address translation data stored in this entry by the decoder 203, the metadata decoder 302 determines whether or not the metadata for MCA update exists in the free area of the compressed address translation data, by referring to the metadata added to the end of the compressed address translation data.

In a case where the metadata for MCA update exists in the free area of the compressed address translation data, the metadata decoder 302 updates the original address translation data obtained by de-compressinq the compressed address translation data by the decoder 203, by using the offset value and the new MCA which are included in the metadata for MCA update. Thus, when the CPU 12 needs to update the value of the MCA corresponding to a certain LCA, the CPU 12 only needs to execute the processing of adding the metadata for MCA update to the compressed address translation data including the MCA of update target and does not need to execute dc-compression and re-compression of the compressed address translation data in real time.

Figure 14:
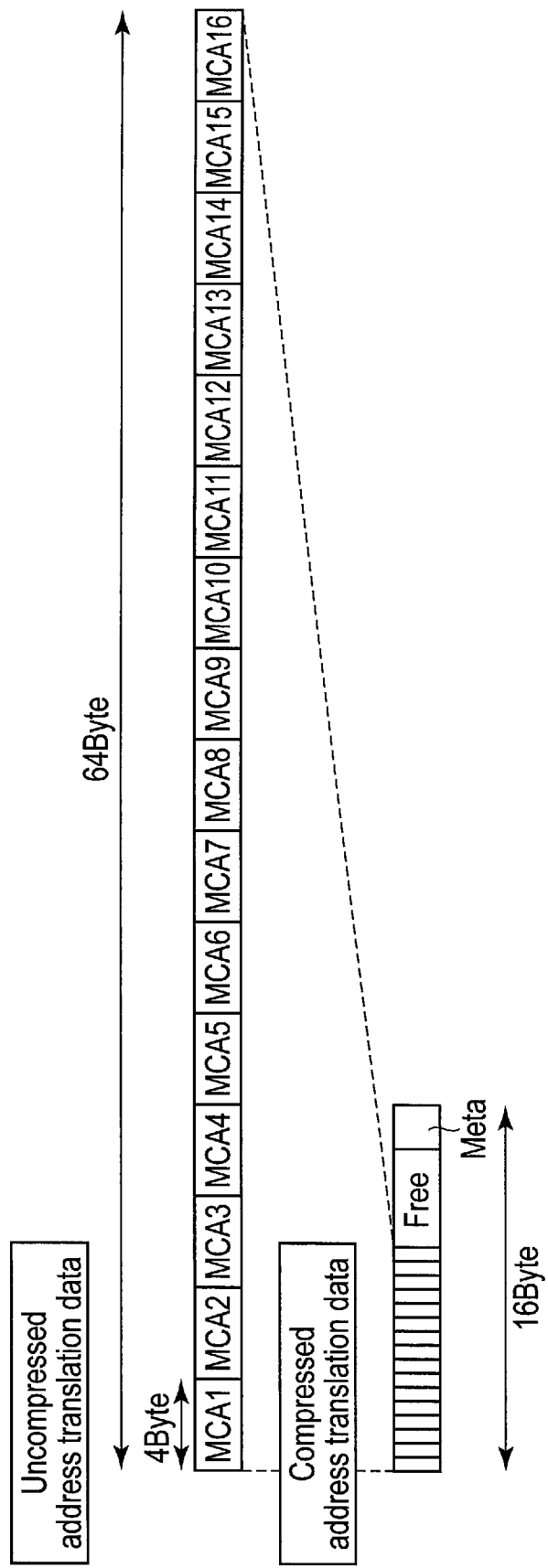
FIG. 14 is a diagram illustrating a relationship between uncompressed address translation data and compressed address translation data storing the metadata.

FIG. 14 illustrates a relationship between the uncompressed address translation data and the compressed address translation data storing the metadata.

As illustrated at an upper part of FIG. 14, the address translation data (uncompressed address translation data) corresponding to one region includes sixteen MCAs (MCA1, MCA2, . . . , MCA16). Since each MCA has the size of 4 bytes as described above, the uncompressed address translation data corresponding to one region has the size of 64 bytes.

A lower part of FIG. 14 illustrates the compressed address translation data obtained by compressing the uncompressed address translation data by the encoder 202. If the actual size of the obtained compressed address translation data is less than 16 bytes, the bit pattern (for example, all "0") indicative of the free area may be added to the compressed address translation data as padding. In the embodiments, the metadata ("Meta") is added to the free area in order to efficiently use the free area of the compressed address translation data.

Figure 15:
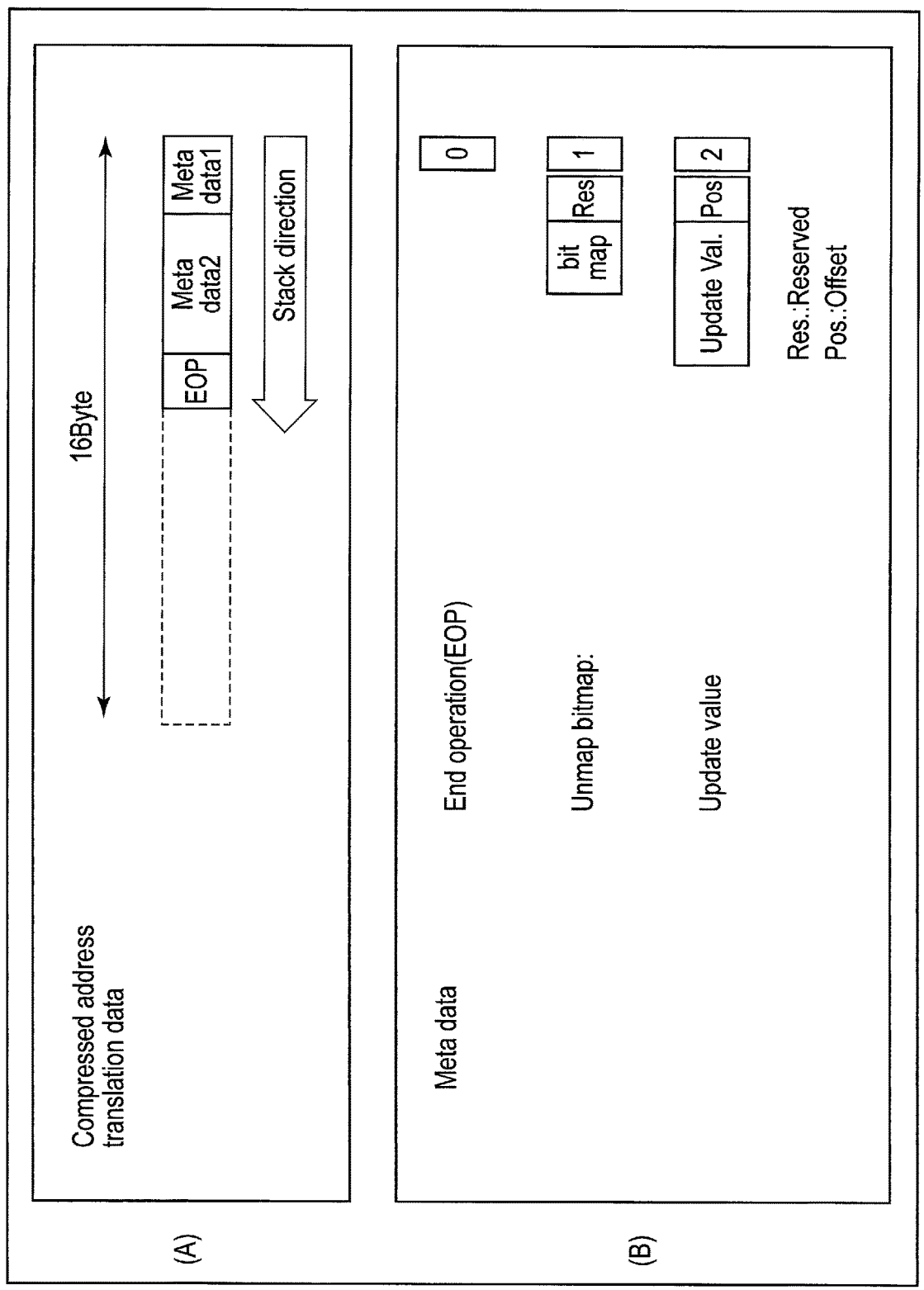
FIG. 15 is a diagram illustrating an example of a format of metadata stored in a free area of each entry of the compressed L2P table cache.

FIG. 15 illustrates an example of a format of the metadata stored in a free area of each entry of the compressed L2P table cache 32.

(A) of FIG. 15 illustrates a 16-byte frame for compressed address translation data. As illustrated as "Stack direction" in (A) of FIG. 15, the metadata is added from the side of the end of the 16-byte frame for compressed address translation data. The number of added metadata is not limited to 1, but plural metadata may be added to the 16-byte frame for compressed address translation data. In (A) of FIG. 15, "MetaData1" and "MetaData2" are added to the 16-byte frame for compressed address translation data. An identifier (End of operation (EOP)) indicative of the end of the metadata is added to the end location of the metadata. The EOP enables the location of the metadata in each entry to be easily specified.

However, if the compressed address translation data obtained by compressing the original address translation data includes no free area where the metadata can be stored, the metadata added to the compressed address translation data is EOP alone.

(B) of FIG. 15 illustrates a format of each metadata. An identifier of EOP is, for example, 0 (="0000").

The unmap bitmap (Unmap Bitmap) includes, for example, an identifier of the unmap bitmap, a 4-bit reservation field, and a 16-bit bitmap. The identifier of the unmap bit map is, for example, 1 (="0001").

The metadata (Update Value) for MCA update includes, for example, an identifier of the metadata for MCA update, a 4-bit offset value, and a new 32-bit MCA value (Update Val.). The identifier of the metadata for MCA update is, for example, 2 (="0010"). This identifier is used as an update instruction. The 4-bit offset value is indicative of a location in the address translation data where MCA to be updated exists. The 4-bit offset value is represented by the above region offset.

Figure 16:
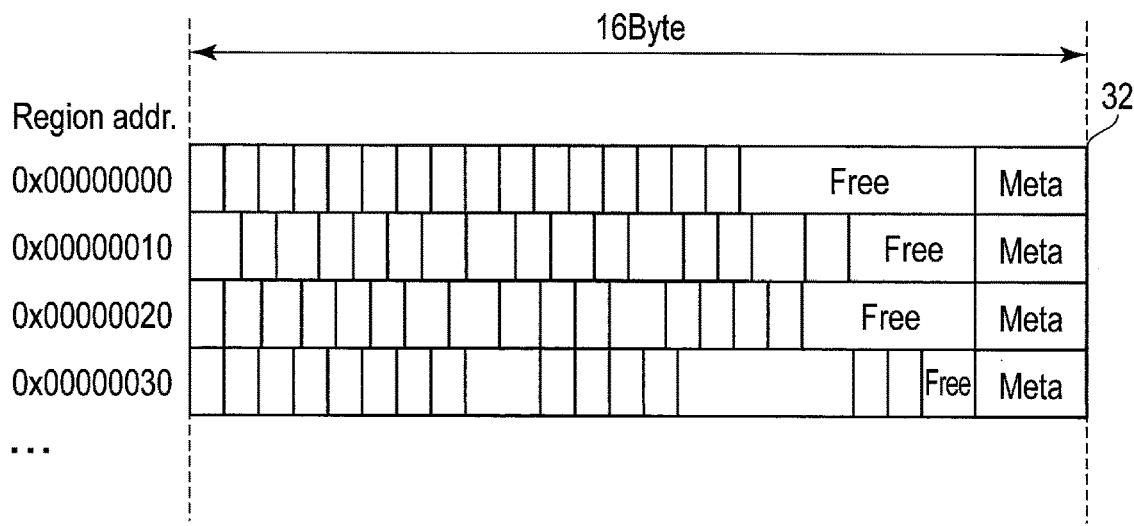
FIG. 16 is a diagram illustrating an example of a content of each entry of the compressed L2P table cache storing the metadata.

FIG. 16 illustrates an example of a content of each entry of the compressed L2P table cache 32 storing the metadata.

In an example illustrated in FIG. 16, metadata is stored in the free area of the entry of the compressed L2P table cache 32 corresponding to region address "0x00000000", metadata is stored in the entry of the compressed L2P table cache 32 corresponding to region address "0x00000010", metadata is stored in the entry of the compressed L2P table cache 32 corresponding to region address "0x00000020", and metadata is stored in the entry of the compressed L2P table cache 32 corresponding to region address "0x00000030".

Figure 17:
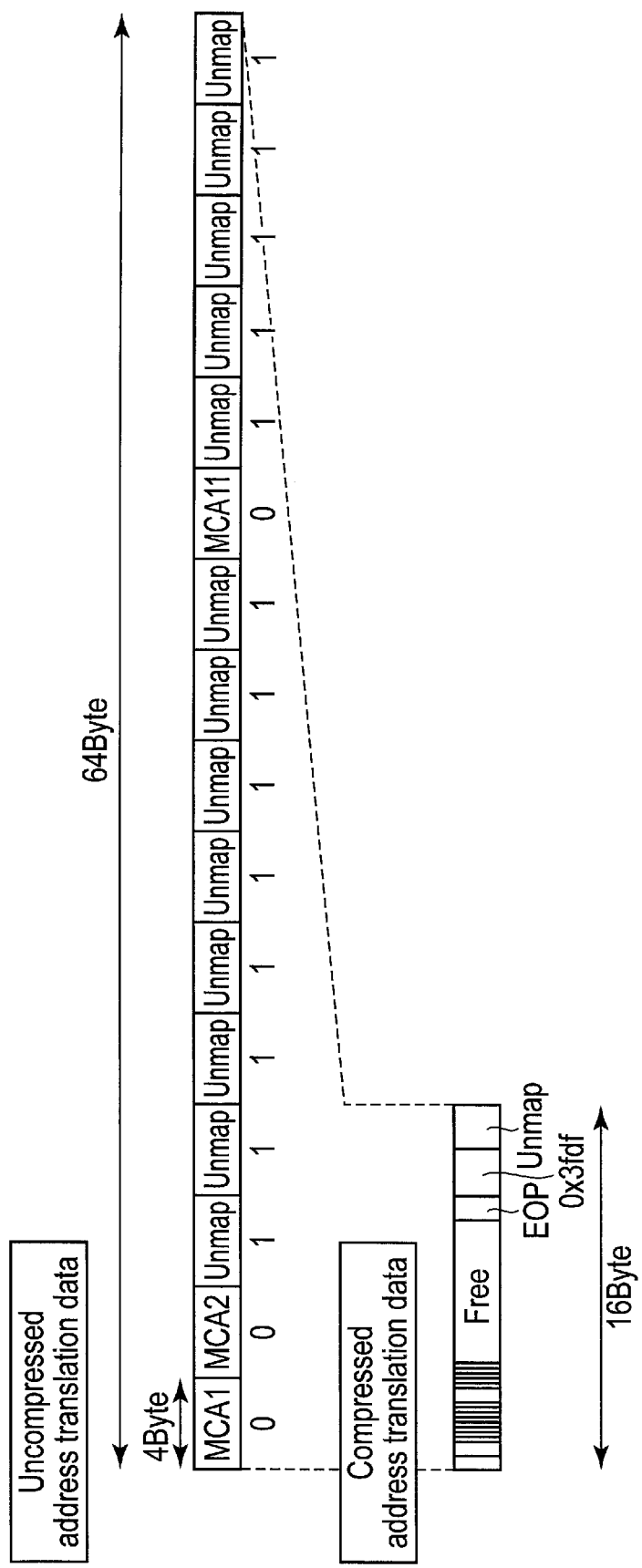
FIG. 17 is a diagram illustrating a relationship between uncompressed address translation data and compressed address translation data storing the metadata.

FIG. 17 illustrates a relationship between the uncompressed address translation data and the compressed address translation data storing the metadata.

In an example illustrated in FIG. 17, MCA1, MCA2, and MCA11 are allocated to LCA1, LCA2, and LCA11 of sixteen LCAs corresponding to a certain region, respectively, and no MCA is allocated to each of the other LCAs of sixteen LCAs. In this case, the unmap bitmap added to the free area of the compressed address translation data obtained by compressing the uncompressed address translation data corresponding to this region includes "Unmap", "0x3fdf", and "EOP". "Unmap" is indicative of both an identifier of 4-bit "0001" and a 4-bit reservation field, and "0x3fdf" is indicative of a 16-bit bitmap "0011111110011111". The bitmap "0011111110011111" is indicative of the order of MCA, MCA, Unmap, Unmap, Unmap, Unmap, Unmap, Unmap, Unmap, Unmap, MCA, Unmap, Unmap, Unmap, Unmap, Unmap.

Since "EOP" is indicative of the end location of the metadata, the controller 4 (compression/de-compression module 131) stores "EOP" in an area adjacent to areas where "Unmap" and "0x3fdf" are stored, as illustrated in FIG. 17. In addition, the controller 4 (compression/de-compression module 131) stores a predetermined bit pattern (padding data) in a remaining area other than areas in the free area where "Unmap", "0x3fdf", and "EOP" are stored. The padding data is stored in an area adjacent to the area where "EOP" is stored.

FIG. 18 illustrates an example of the compressed L2P table cache 32 in which the unmap bit map is added to the free area of the compressed address translation data.

In the example illustrated, the unmap bitmap is added to each of the entry of the compressed L2P table cache 32 corresponding to region address "0x00000000", and the entry of the compressed L2P table cache 32 corresponding to region address "0x00000020".

For example, in the unmap check operation of checking whether or not the MCA is allocated to a specific LCA belonging to region address "0x00000020", the region address "0x00000020" is designated. The metadata (unmap bitmap in this example) stored in the entry of the compressed L2P table cache 32 corresponding to the designated region address "0x00000020" is referred to.

Figure 19:
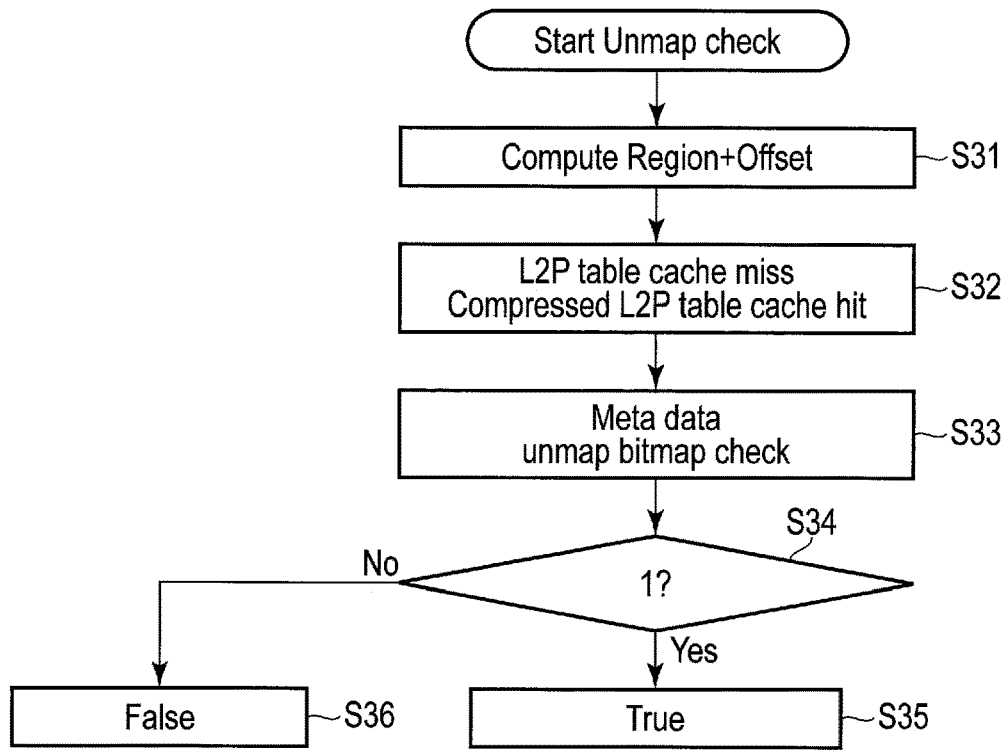
FIG. 19 is a flowchart illustrating a procedure of the unmap check operation executed by using the compressed L2P table cache storing the metadata.

The flowchart of FIG. 19 illustrates a procedure of the unmap check operation executed by using the compressed L2P table cache 32 storing the metadata.

Checking whether or not MCA is allocated to a specific logical address (LCAx) designated by the host 2 is assumed here.

The CPU 12 computes a region address of the region to which the specific LCAx belongs and the offset in this region, from the specific LCAx (step S31). The CPU 12 determines whether or not the address translation data corresponding to the computed region address exists in the L2P table cache 31 and whether or not the compressed address translation data corresponding to the computed region address exists in the compressed L2P table cache 32 (step S32).

In a case where the address translation data corresponding to the computed region address does not exist in the L2P table cache 31 (L2P table cache miss) and the compressed address translation data corresponding to the computed region address exists in the compressed L2P table cache 32 (compressed L2P table cache hit), the CPU 12 does not de-compress the compressed address translation data corresponding to the computed region address, but refers to the metadata (unmap bitmap) stored in the entry in the compressed L2P table cache 32 where this compressed address translation data is stored (step S33). In step S33, the CPU 12 determines whether or not the value of the bit at the bit location indicated by the computed offset, of 16 bits in the unmap bitmap, is "1" (step S33).

If the value of the bit is "1" (YES in step S35), the CPU 12 determines that the specific LCAx is a LCA to which no MCA is allocated (step S35). In contract, if the value of the bit is "0" (NO in step S35), the CPU 12 determines that the specific LCAx is a LCA to which a MCA is allocated (step S36).

Thus, the CPU 12 can execute the unmap check operation without de-compressing the compressed address translation data.

Figure 20:
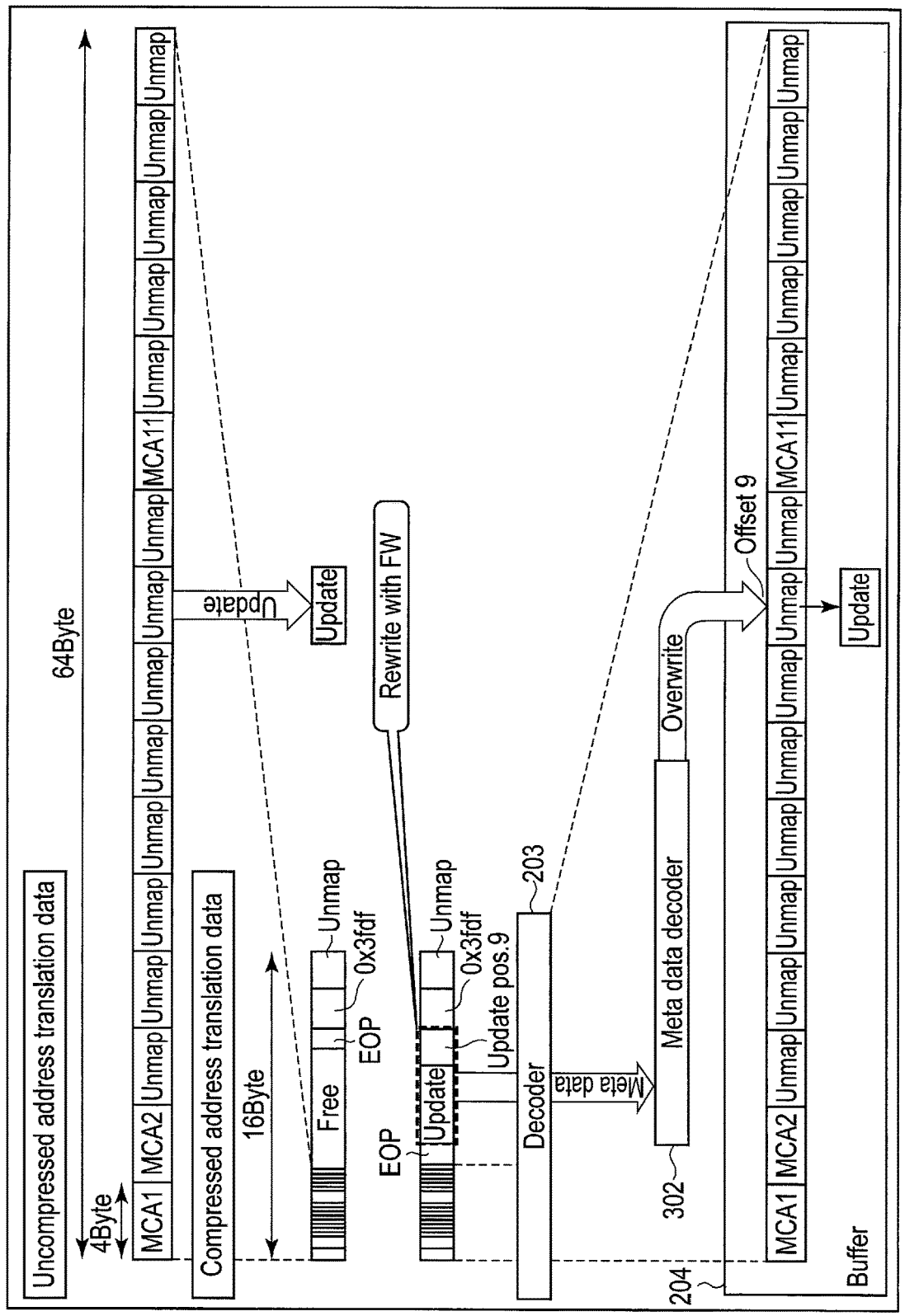
FIG. 20 is a diagram illustrating an address update operation executed by using the compressed L2P table cache storing the metadata.

FIG. 20 illustrates the address update operation executed with the compressed L2P table cache 32 storing the metadata.

When MCA corresponding to a certain LCA is to be updated, a region address of a region to which the LCA belongs and the offset in this region are computed from the LCA. Then, the entry in the compressed L2P table cache 32 where the compressed address translation data corresponding to the computed region address is stored is specified. Then, the metadata stored in the free area in the specified entry is updated by the CPU 12 (firmware) and metadata (Update Value) for MCA update is thereby added to the metadata. The location of the EOP is changed to the end location of the metadata (Update Value) for MCA update from the end location of the unmap bitmap.

When execution of the processing of de-compressing the compressed address translation data is instructed by the CPU 12, the decoder 203 de-compresses this compressed address translation data (including the metadata) read from the compressed L2P table cache 32, and stores the original uncompressed address translation data obtained by de-compressing this compressed address translation data, in the buffer 204. The metadata added to this compressed address translation data is sent to the metadata decoder 302.

The metadata decoder 302 determines whether or not the metadata for MCA update is included in this metadata. In a case where the metadata for MCA update is included in this metadata, the metadata decoder 302 overwrites the MCA value at the location designated by the offset included in the metadata for MCA update, of sixteen MCA values included in the original uncompressed address translation data stored in the buffer 204, with a new MCA value included in the metadata for MCA update. The MCA value at the location designated by this offset is updated to the new MCA value on the buffer 204. The CPU 12 can therefore use uncompressed address translation data including the updated MCA value.

Figure 21:
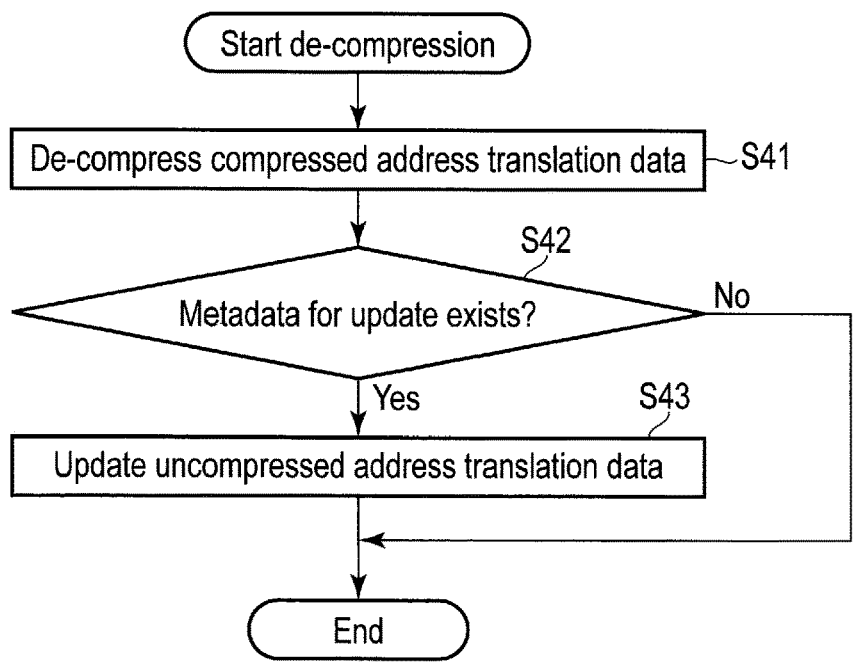
FIG. 21 is a flowchart illustrating a procedure of an address update operation which is executed in a processing of de-compressing the compressed address translation data included in the compressed L2P table cache storing the metadata.

The flowchart of FIG. 21 illustrates a procedure of the address update operation executed in the processing of de-compressing the compressed address translation data in the compressed L2P table cache 32 storing the metadata.

The decoder 203 of the compression/de-compression module 131 de-compresses the compressed address translation data read from the compressed L2P table cache 32, and stores the original uncompressed address translation data obtained by de-compressing the compressed address translation data, in the buffer 204 (step S41). The metadata decoder 302 of the compression/de-compression module 131 refers to the metadata in this compressed address translation data and determines whether or not the metadata for MCA update exists in this metadata (step S42). In this case, if an identifier (update instruction) of 4 bits "0010" exists in this metadata, the metadata decoder 302 determines that the metadata for MCA update exists in this metadata.

In a case where the metadata for MCA for update exists in this metadata (YES in step S42), the metadata decoder 302 updates the original uncompressed address translation data stored in the buffer 204, by using the new MCA value and the offset which are included in the metadata for MCA update (step S43). In step S43, the metadata decoder 302 overwrites the MCA value at the location designated by the offset included in the metadata for MCA update, of sixteen MCA values included in the original uncompressed address translation data, with the new MCA value included in the metadata for MCA update.

Next, the logical-to-physical address translation operation executed by using the L2P table cache 31 and the compressed L2P table cache 32 will be explained.

Figure 22:
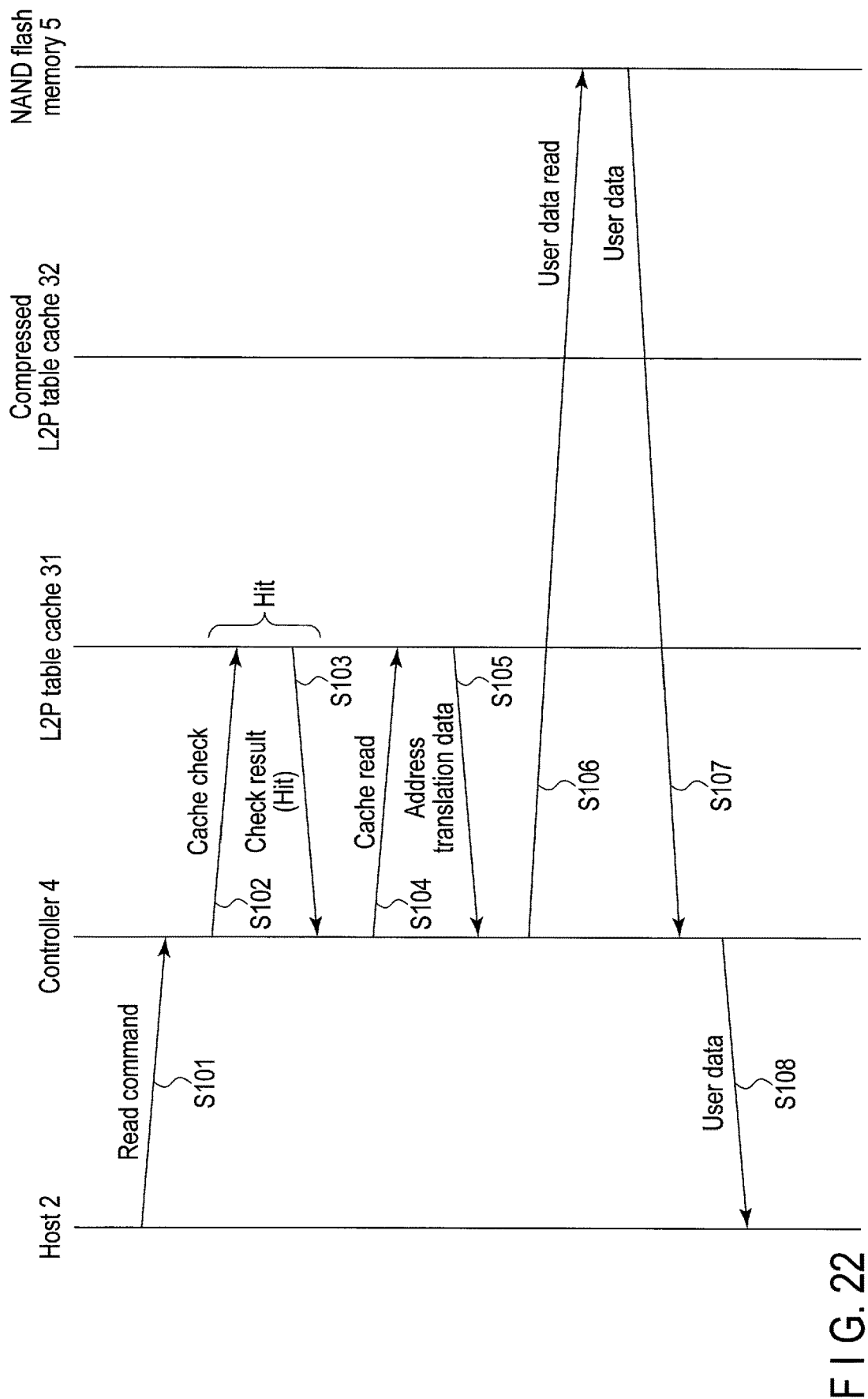
FIG. 22 is a diagram illustrating a processing sequence of a cache control operation executed by the memory system of the embodiment when cache hit of the L2P table cache occurs.

FIG. 22 illustrates a processing sequence of the cache control operation executed when the cache hit of the L2P table cache 21 occurs.

The host 2 sends a read command to the SSD 3 (step S101). When the controller 4 receives the read command from the host 2, the controller 4 executes the cache hit check of the L2P table cache 31 (step S102), and determines whether the L2P table cache 31 is in a state of the cache hit or a state of the cache miss, based on a result of the cache hit check (step S103).

The cache hit means a state in which address translation data including the physical address corresponding to the logical address specified by the read command exists in the L2P table cache 31. The cache miss means a state in which the address translation data including the physical address corresponding to the logical address specified by the read command does not exist in the L2P table cache 31.

If the L2P table cache 31 is in the cache hit, the controller 4 read-accesses the L2P table cache 31 and reads the address translation data from the L2P table cache 31 (steps S104 and S105). The controller 4 retrieves the physical address corresponding to the logical address in the read command from the address translation data. The controller 4 can read only this physical address in the address translation data from the L2P table cache 31.

The controller 4 read-accesses the NAND flash memory 5 by using this physical address and reads the user data designated by the logical address in the read command from the NAND flash memory 5 (steps S106 and S107). The controller 4 returns the user data to the host 2 (step S108).

Figure 23:
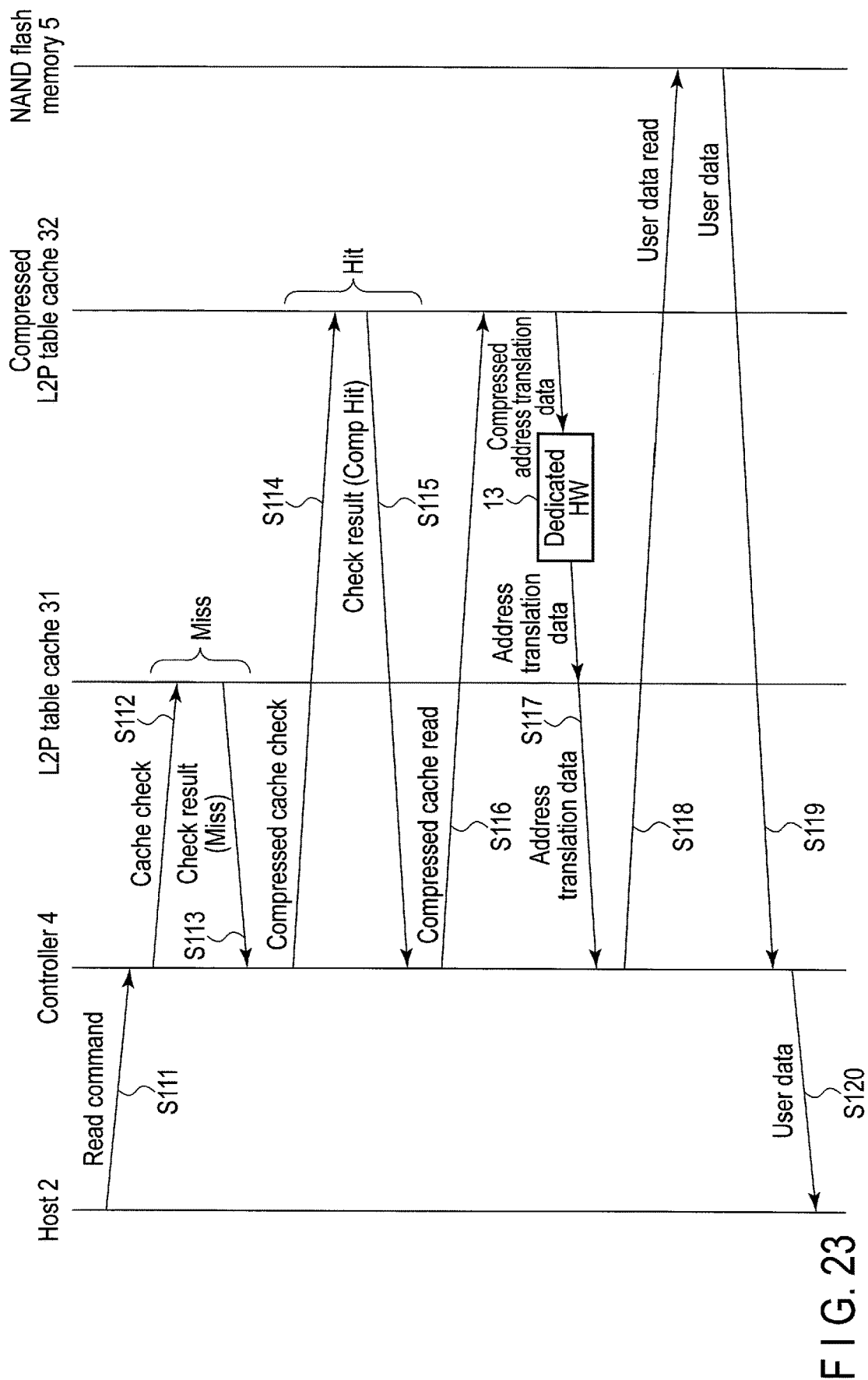
FIG. 23 is a diagram illustrating a processing sequence of a cache control operation executed by the memory system of the embodiment when a cache miss of the L2P table cache occurs and when cache hit of the compressed L2P table cache occurs.

FIG. 23 illustrates a processing sequence of the cache control operation when a cache miss of the L2P table cache 31 occurs and when a cache hit of the compressed L2P table cache 32 occurs.

The host 2 sends a read command to the SSD 3 (step S111). When the controller 4 receives the read command from the host 2, the controller 4 executes the cache hit check of the L2P table cache 31 (step S112), and determines whether the L2P table cache 31 is in a state of the cache hit or a state of the cache miss, based on a result of the cache hit check (step S113).

If the L2P table cache 31 is in the cache miss, the controller 4 executes the cache hit check (compressed cache hit check) of the compressed L2P table cache 32 (step S114), and determines whether the compressed L2P table cache 32 is in a state of the cache hit (compressed cache hit) or a state of the cache miss (compressed cache miss), based on a result of the compressed cache hit check (step S115).

The compressed cache hit means a state in which the compressed address translation data obtained by compressing the address translation data including the physical address corresponding to the logical address designated by the read command exists in the compressed L2P table cache 32. The compressed cache miss means a state in which this compressed address translation data does not exist in the compressed L2P table cache 32. Even if the compressed L2P table cache 32 is configured to have M+1 entries, the compressed cache miss may occur until the compressed address translation data are cached to all of the entries of the compressed L2P table cache 32.

In addition, in the L2P table cache 31, the entry is evicted from the L2P table cache 31 as needed. For this reason, the cache miss of the L2P table cache 31 may occur and the cache hit (compressed cache hit) of the compressed L2P table cache 32 may occur in some cases.

In this case, the controller 4 read-accesses the compressed L2P table cache 32 and reads the compressed address translation data from the compressed L2P table cache 32 (steps S116 and S117). In this case, the operation of reading the compressed address translation data from the compressed L2P table cache 32, the decoding operation of de-compressing the compressed address translation data, and the operation of transferring the uncompressed address translation data obtained by this decoding operation to the entry of the address translation table cache 31 can be executed by the dedicated hardware 13. The controller 4 retrieves the physical address corresponding to the logical address in the read command from the uncompressed address translation data transferred to the cache entry of the L2P table cache 31.

The controller 4 read-accesses the NAND flash memory 5 by using this physical address and reads the user data designated by the logical address in the read command from the NAND flash memory 5 (steps S118 and S119). The controller 4 returns the user data to the host 2 (step S120).

Figure 24:
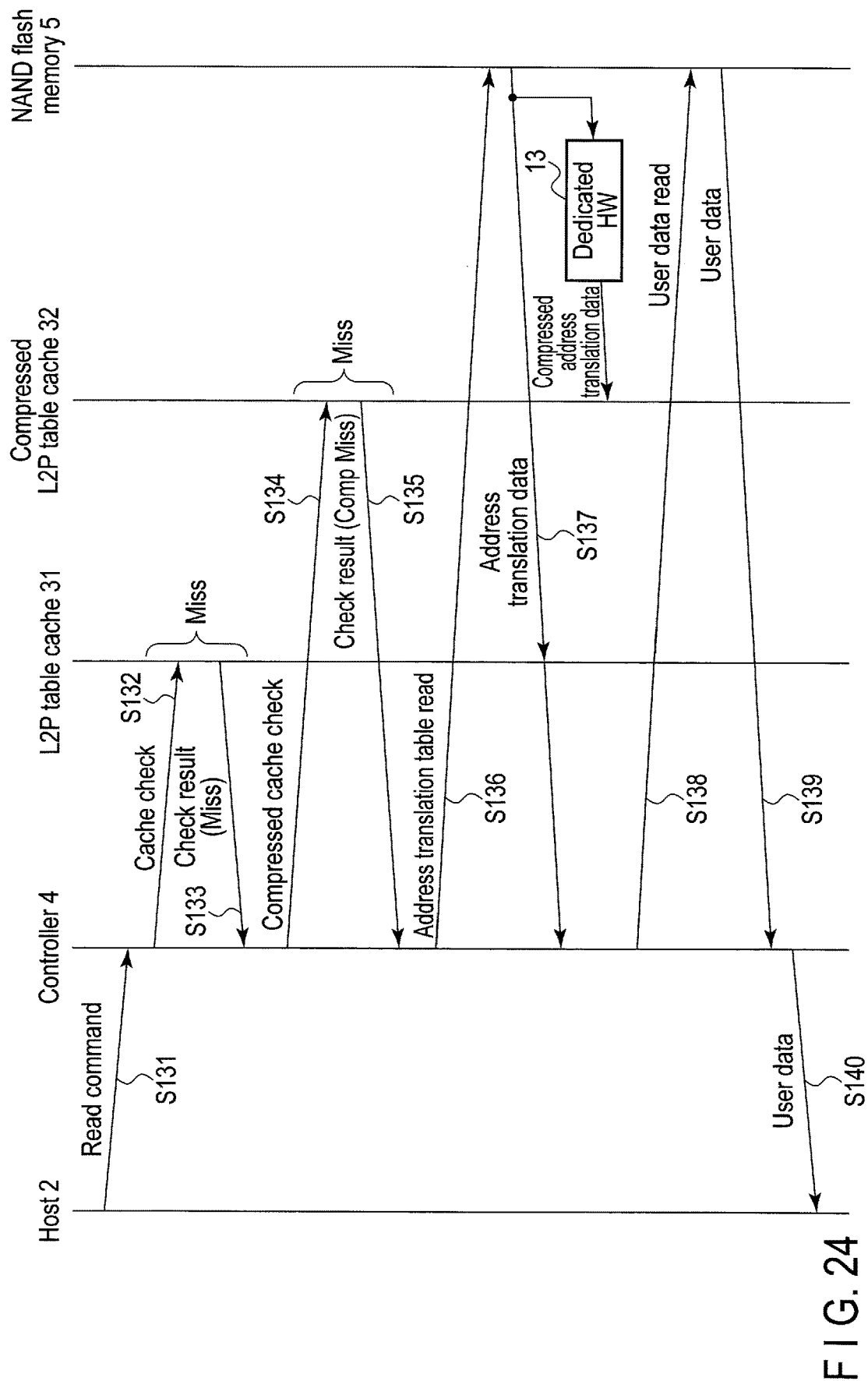
FIG. 24 is a diagram illustrating a processing sequence of a cache control operation executed by the memory system of the embodiment when a cache miss of the L2P table cache occurs and when a cache miss of the compressed L2P table cache occurs.

FIG. 24 illustrates a processing sequence of the cache control operation when a cache miss of the L2P table cache 31 occurs and when a cache miss of the compressed L2P table cache 32 occurs.

The host 2 sends a read command to the SSD 3 (step S131). When the controller 4 receives the read command from the host 2, the controller 4 executes the cache hit check of the L2P table cache 31 (step S132), and determines whether the L2P table cache 31 is in a state of the cache hit or a state of the cache miss, based on a result of the cache hit check (step S133).

If the L2P table cache 31 is in the cache miss, the controller 4 executes the cache hit check (compressed cache hit check) of the compressed L2P table cache 32 (step S134), and determines whether the compressed L2P table cache 32 is in a state of the cache hit (compressed cache hit) or a state of the cache miss (compressed cache miss), based on a result of the compressed cache hit check (step S135).

When the compressed L2P table cache 32 is in the compressed cache miss, the controller 4 executes an operation of read-accessing the L2P table 8 in the NAND flash memory 5 and reading the address translation data including the physical address corresponding to this logical address from the L2P table 8, an operation of storing the read address translation data in the L2P table cache 31, an operation of retrieving the physical address corresponding to the logical address in the read command, and an operation of storing, in the compressed L2P table cache 32, the compressed address translation data obtained by compressing the read address translation data (steps S136 and S137).

Compression and transfer including the operation of reading the address translation data from the L2P table 8, the encoding operation of de-compressing the read address translation data, and the operation of storing the compressed address translation data obtained by the encoding operation in the compressed L2P table cache 32 can be executed by the dedicated hardware 13.

The controller 4 read-accesses the NAND flash memory 5 by using this physical address and reads the user data designated by the logical address in the read command from the NAND flash memory 5 (steps S138 and S139). The controller 4 returns the user data to the host 2 (step S140).

As described above, according to the embodiment, the probability of accessing the random-access memory such as the DRAM 5 can be made higher than that of accessing the L2P table 8 in the NAND flash memory 5, by using both the L2P table cache 31 and the compressed L2P table cache 32. Therefore, the performance of the logical-to-physical address translation can be enhanced and, furthermore, the performance of the SSD 3 can be improved.

In addition, since the free area (i.e., an area other than the area used as the compressed logical-to-physical address translation table) of each entry of the compressed L2P table cache 32 stores the uncompressed metadata indicative of a part of the contents of the original address translation data, the controller 5 can check a part of the contents of the address translation data which does not exist in the L2P table cache 31 by referring to the metadata of the compressed L2P table cache 32, without de-compressing the compressed address translation data, if the processing of checking several parts of the contents of the address translation data which does not exist in the L2P table cache 31 needs to be executed. Therefore, every time the necessity to check a part of the contents of the original address translation data is generated, the processing of de-compressing the compressed address translation data, the processing of searching the work RAM, and the like do not need to be executed. Therefore, the number of times of the operation of de-compressing the compressed address translation data and the operation of re-compressing the de-compressed compressed address translation data is reduced. As a result, the time required to refer to the address translation data can be reduced and the performance of the SSD 3 can be thereby improved.

Since the EOP, i.e., the identifier indicative of the end of the metadata is stored in the free area of each entry of the compressed L2P table cache 32, the controller can easily specify and refer to the metadata in each entry of the compressed L2P table cache 32.

In addition, since the free area of each entry of the compressed L2P table cache 32 (i.e., the free area of the compressed address translation data) is used to store the metadata, the free area of each entry where the compressed address translation data having the size of less than 16 bytes is stored can be used efficiently.

Furthermore, the free area of the entry where the compressed address translation data including the physical address of update target is stored can be used to store a new physical address. Thus, the processing of de-compressing and re-compressing the compressed address translation data does not to be executed every time the physical address is updated.

In the embodiment, the processing of generating the metadata and the processing of updating the address, based on the metadata for MCA update are executed by the compression/de-compression module 131, but the processing of generating the metadata and the processing of updating the address, based on the metadata for MCA update may be executed by the CPU 12 (firmware). In a case of generating the metadata by the CPU 12 (firmware), the CPU 12 (firmware) may writ the metadata to the free area of each entry of the compressed L2P table.

In the embodiments, a NAND flash memory is illustrated as an example of a nonvolatile memory. However, the functions of the present embodiment are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory; and
a controller electrically connected to the nonvolatile memory and configured to store a part of a logical-to-physical address translation table stored in the nonvolatile memory, as a first cache, in a random-access memory, and to store a compressed logical-to-physical address translation table obtained by compressing the logical-to-physical address translation table, as a second cache, in the random-access memory, the logical-to-physical address translation table including a plurality of address translation data corresponding to a plurality of logical address regions, each of the plurality of address translation data including a plurality of physical addresses corresponding to a plurality of consecutive logical addresses included in each of the logical address regions, the first cache including a plurality of entries each storing the address translation data corresponding to any one of the logical address regions, the second cache including a plurality of entries each storing compressed address translation data obtained by compressing the address translation data corresponding to any one of the logical address regions, wherein the controller is configured to:

in a case where first address translation data including a first physical address of the nonvolatile memory corresponding to a first logical address designated by the host does not exist in the first cache and first compressed address translation data obtained by compressing the first address translation data exists in the second cache, execute an operation of storing uncompressed address translation data obtained by de-compressing the first compressed address translation data, in the first cache, and an operation of retrieving the first physical address from the uncompressed address translation data, wherein the first address translation data includes a plurality of physical addresses corresponding to a plurality of logical addresses included in a first logical address area, and wherein a logical address corresponding to a physical address having a specific bit pattern is a logical address to which a physical address is not allocated;

perform an operation of compressing the first address translation data by dividing the first address translation data into a plurality of data portions corresponding to the plurality of physical addresses included in the first address translation data, and by converting a bit pattern of each of the data portions into a shorter bit pattern;

generate, when performing the operation of compressing the first address translation data, first information including bitmap data by assigning a first bit value to each of physical addresses having the specific bit pattern, of the plurality of physical addresses, and by assigning a second bit value to each of physical addresses not having the specific bit pattern, of the plurality of physical addresses, and store first information including the bitmap data in a first area of a first entry of the second cache, the first entry being an entry where the first compressed address translation data is stored, the first area being a free area in the first entry that does not contain the first compressed address translation data; and when executing processing of checking whether or not a logical address designated by the host, of the plurality of logical addresses, is a logical address to which a physical address is not allocated, refer to the bitmap data of the first information stored in the first entry of the second cache, wherein the bitmap data includes a plurality of bits corresponding to the plurality of logical addresses included in the first logical address area, each of the plurality of bits indicating whether or not a corresponding logical address is a logical address to which a physical address is not allocated.

2. The memory system of claim 1, wherein
each of the plurality of entries of the second cache has a predetermined size, and the predetermined size is smaller than a size of each of the plurality of entries of the first cache.

3. The memory system of claim 1, wherein
the controller stores second information which is an identifier indicative of an end of the first information, in an area adjacent to an area where the first information is stored.

4. The memory system of claim 3, wherein
the controller further stores third information which is a predetermined bit pattern, in the first area.

5. The memory system of claim 4, wherein
the controller stores the third information in an area adjacent to the area where the second information is stored.

6. The memory system of claim 3, wherein
in a case where the first information is unable to be stored in the first area, the controller does not store the first information in the first area but stores the second information in the first area.

7. The memory system of claim 1, wherein
when the controller executes the processing of checking whether or not a logical address designated by the host, of the plurality of logical addresses, is a logical address to which a physical address is not allocated, the controller refers to the first information including the bitmap data, without de-compressing the first compressed address translation data.

8. The memory system of claim 1, wherein
the controller comprises a compression circuit which compresses the first address translation data to generate the first compressed address translation data, and
the compression circuit is configured to generate, when performing the operation of compressing the first address translation data, the first information including the bitmap data.

9. The memory system of claim 8, wherein
the controller is configured to notify the compression circuit of a bit pattern to be detected, as the specific bit pattern.

10. The memory system of claim 1, wherein
the controller is configured to store, when updating a first physical address of a plurality of physical addresses corresponding to the first compressed address translation data included in the first entry, an offset value indicative of a location where the first physical address of the plurality of physical addresses of the first entry is stored, and an updated physical address of the first physical address, in the first area of the first entry.

11. The memory system of claim 10, wherein
the controller is configured to update, when de-compressing the first compressed address translation data included in the first entry, the uncompressed address translation data obtained by de-compressing the first compressed address translation data stored in the first entry, by using the offset value and the updated physical address.

* * * * *